(12) United States Patent
Choi et al.

(10) Patent No.: US 12,719,898 B2
(45) Date of Patent: Aug. 25, 2026

(54) SIGNAL PROCESSING DEVICE AND VEHICLE COMMUNICATION DEVICE INCLUDING THE SAME

(71) Applicant: LG ELECTRONICS INC., Seoul (KR)

(72) Inventors: Jooyoung Choi, Seoul (KR); Younggon Kim, Seoul (KR); Chaeguk Cho, Seoul (KR); Changhun Sung, Seoul (KR); Hansung Kim, Seoul (KR); Taekyoung Kim, Seoul (KR); Junsang Park, Seoul (KR); Youngjae Kim, Seoul (KR); Jaejin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 18/575,519

(22) PCT Filed: Jun. 30, 2022

(86) PCT No.: PCT/KR2022/009478
§ 371 (c)(1),
(2) Date: Dec. 29, 2023

(87) PCT Pub. No.: WO2023/277637
PCT Pub. Date: Jan. 5, 2023

(65) Prior Publication Data

US 2024/0320068 A1 Sep. 26, 2024

(30) Foreign Application Priority Data

Jul. 1, 2021 (KR) ........................ 10-2021-0086549

(51) Int. Cl.
*G06F 9/54* (2006.01)
*B60R 16/023* (2006.01)
(Continued)

(52) U.S. Cl.
CPC ........ *H04L 63/1425* (2013.01); *B60R 16/023* (2013.01); *G06F 9/45558* (2013.01);
(Continued)

(58) Field of Classification Search
None
See application file for complete search history.

(56) References Cited

U.S. PATENT DOCUMENTS 6,006,301 A * 12/1999 Tetrick .................... G06F 13/24 710/260
6,374,321 B2 * 4/2002 Pawlowski ............. G06F 13/24 710/48
(Continued)

FOREIGN PATENT DOCUMENTS

CN 108712733 A 10/2018
DE 11 2019 004 293 T5 7/2021
(Continued)

OTHER PUBLICATIONS

García-Sánchez et al., "Deploying intelligent e-Health services in a mobile gateway," ResearchGate, Aug. 1, 2012, 20 pages total.
(Continued)

*Primary Examiner* — Van H Nguyen
(74) *Attorney, Agent, or Firm* — Birch, Stewart, Kolasch & Birch, LLP

(57) ABSTRACT

A signal processing device and a vehicle communication device including the same are disclosed. The signal processing device according to an embodiment of the present disclosure includes: a first processor to receive a first message including a sensor signal based on a first communication scheme and to process the received first message; a second processor to receive a second message including a communication message based on a second communication scheme and to process the received second message; and a
(Continued)

shared memory to operate to transmit the first message or the second message between the first processor and the second processor, wherein the first processor or the second processor is configured to receive the first message or the second message stored in the shared memory based on an interrupt signal. Accordingly, latency may be reduced and high-speed data transmission may be performed during inter-processor communication.

18 Claims, 22 Drawing Sheets

(51) Int. Cl.

| | |
|---|---|
| ***G06F 9/455*** | (2018.01) |
| ***H04L 9/40*** | (2022.01) |
| ***H04L 12/66*** | (2006.01) |
| ***H04L 41/08*** | (2022.01) |
| ***H04L 41/084*** | (2022.01) |
| ***H04L 41/5054*** | (2022.01) |
| ***H04L 67/12*** | (2022.01) |
| ***H04W 4/40*** | (2018.01) |
| ***H04W 4/48*** | (2018.01) |
| ***H04W 12/40*** | (2021.01) |
| *H04L 12/40* | (2006.01) |

(52) U.S. Cl.

CPC .............. *G06F 9/544* (2013.01); *G06F 9/546* (2013.01); *H04L 12/66* (2013.01); *H04L 41/08* (2013.01); *H04L 41/084* (2013.01); *H04L 41/5054* (2013.01); *H04L 67/12* (2013.01); *H04W 4/40* (2018.02); *H04W 4/48* (2018.02); *H04W 12/40* (2021.01); *G06F 2009/45595* (2013.01); *H04L 2012/40215* (2013.01); *H04L 2012/40273* (2013.01)

(56) References Cited

U.S. PATENT DOCUMENTS

| | | | | |
|---|---|---|---|---|
| 6,401,154 | B1 * | 6/2002 | Chiu | G06F 13/24 710/266 |
| 7,962,771 | B2 * | 6/2011 | Song | G06F 9/4812 713/300 |
| 9,563,431 | B2 * | 2/2017 | Tamir | G06F 9/5038 |
| 9,575,911 | B2 * | 2/2017 | McMenamin | G06F 13/26 |
| 10,899,317 | B1 | 1/2021 | Moeller et al. | |
| 11,040,186 | B2 * | 6/2021 | Burkholz | A61M 39/284 |
| 11,165,851 | B2 | 11/2021 | Galula et al. | |
| 11,816,057 | B2 | 11/2023 | Saxena et al. | |
| 2005/0216770 | A1 | 9/2005 | Rowett et al. | |
| 2009/0193057 | A1 | 7/2009 | Maes | |
| 2013/0070773 | A1 | 3/2013 | Lee et al. | |
| 2017/0099195 | A1 | 4/2017 | Raney | |
| 2017/0371698 | A1 | 12/2017 | Paolino et al. | |
| 2018/0004964 | A1 | 1/2018 | Litichever et al. | |
| 2019/0156650 | A1 | 5/2019 | Takagi | |
| 2019/0199537 | A1 | 6/2019 | Seo et al. | |
| 2019/0268420 | A1 | 8/2019 | Acharya et al. | |
| 2020/0143053 | A1 | 5/2020 | Gutierrez et al. | |
| 2020/0183732 | A1 | 6/2020 | Cornett et al. | |
| 2020/0186560 | A1 | 6/2020 | Ben-Noon et al. | |
| 2020/0274851 | A1 | 8/2020 | Qiao et al. | |
| 2020/0285779 | A1 | 9/2020 | Foltin et al. | |
| 2021/0075800 | A1 | 3/2021 | Paraskevas et al. | |
| 2021/0152605 | A1 | 5/2021 | Mizrahi | |
| 2022/0126864 | A1 | 4/2022 | Moustafa et al. | |
| 2022/0303305 | A1 | 9/2022 | Shin et al. | |

FOREIGN PATENT DOCUMENTS

| | | | |
|---|---|---|---|
| EP | 1 688 836 | A1 | 8/2006 |
| EP | 3 402 172 | A1 | 11/2018 |
| EP | 3 745 271 | A1 | 12/2020 |
| JP | 2017-112590 | A | 6/2017 |
| KR | 10-2004-0041718 | A | 5/2004 |
| KR | 10-2009-0092370 | A | 9/2009 |
| KR | 10-2010-0111225 | A | 10/2010 |
| KR | 10-1159377 | B1 | 6/2012 |
| KR | 10-1206894 | B1 | 11/2012 |
| KR | 10-2013-0068631 | A | 6/2013 |
| KR | 10-1446525 | B1 | 10/2014 |
| KR | 10-1612825 | B1 | 4/2016 |
| KR | 10-2017-0099701 | A | 9/2017 |
| KR | 10-2020-0140542 | A | 12/2020 |
| KR | 10-2244569 | B1 | 4/2021 |
| WO | WO 2015/103376 | A1 | 7/2015 |

OTHER PUBLICATIONS

M.P. de Vos, "Integration of wireless sensor networks with a service-oriented architecture," TU/e, Eindhoven University of Technology, May 2009, 105 pages total.

Sim et al., "Service-Oriented Gateway: Connecting Automotive Ethernet and Cloud for Efficient Development of Connected Car Services," IEEE SA, 2020, 23 pages total.

Banks et al., "MQTT Version 5.0 OASIS Standard Mar. 7, 2019 Specification URIs", Mar. 7, 2019 pp. 1-137, XP055902412, Retrieved from the Internet: URL: https://docs.oasisopen.org/mqtt/mqtt/v5.0/os/mqtt-v5.0-os.pdf.

Chisnall, "The Definitive Guide to the Xen Hypervisor", Jan. 1, 2008, XP055728173, ISBN: 978-0-13-234971-0, Retrieved from the Internet: URL: https://www.mobt3ath.com/uplode/book/book-55475.pdf.

Kiran K N et al., Dpdk Contrail: "Day One: Contrail DPDK vRouter, URL: https://www.juniper.net/documentation/en_US/day-one-books/contrail-DPDK.pdf", Jan. 1, 2021, XP093090925, 196 pages total.

"High-performance vehicle network processor based on Arm@ Cortex@-M7 and Cortex-A53 technology," NXP S32G2 Product Brief Rev. 8.1, Apr. 2021, 30 pages total.

* cited by examiner

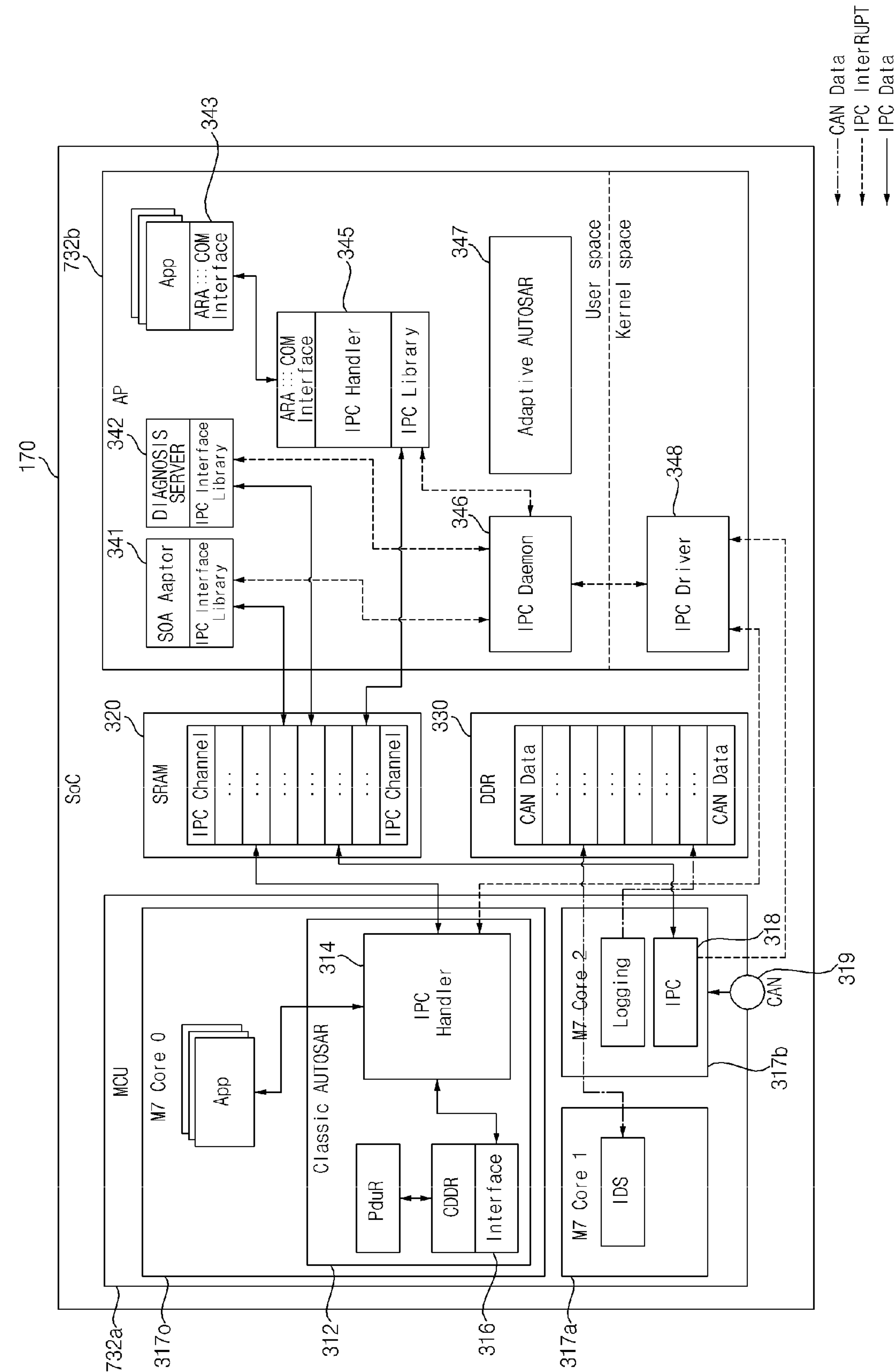
FIG.3
170
SoC
732b
AP
343
App
ARA::: COM Interface
345
ARA::: COM Interface
IPC Handler
IPC Library
347
Adaptive AUTOSAR
User space
Kernel space
342
DIAGNOSIS SERVER
IPC Interface Library
341
SOA Aaptor
IPC Interface Library
346
IPC Daemon
348
IPC Driver
320
SRAM
IPC Channel
IPC Channel
330
DDR
CAN Data
CAN Data
MCU
M7 Core 0
App
Classic AUTOSAR
314
IPC Handler
PduR
CDDR
Interface
M7 Core 2
Logging
IPC
318
CAN
319
317b
M7 Core 1
IDS
732a
317o
312
316
317a
CAN Data
IPC InterRUPT
IPC Data 600x
610
Body
614
Chassis
616
CAN Diagnostic Tester
618
CAN ECU
632a
634a
636a
CAN Signal
630a
Communication Gateway
MCU
IPC Mngr
CAN Transceiver
IPC via Eth
630b
Communication Gateway
AP
IPC Mngr
Ethernet Switch
632b
634b
636b
Ethernet Message
620
TCU
622
HU
624
Ethernet Diagnostic Tester
626
Ethernet ECU

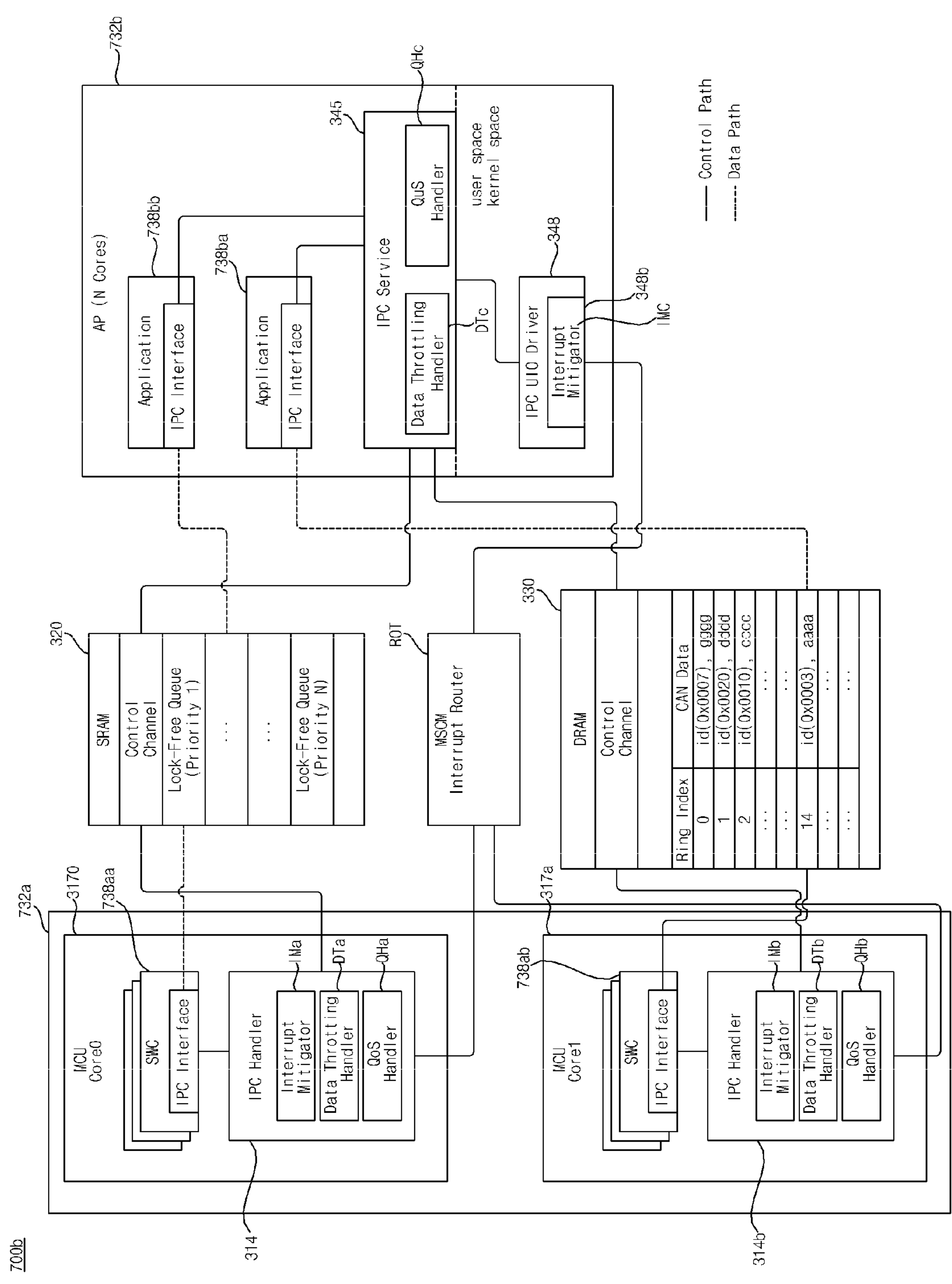
FIG.8
700b
732b
AP (N Cores)
Application
IPC Interface
738bb
738ba
345
IPC Service
QuS Handler
QHc
Data Throttling Handler
DTc
user space
kernel space
348
IPC UIO Driver
Interrupt Mitigator
348b
IMC
Control Path
Data Path
320
SRAM
Control Channel
Lock-Free Queue (Priority 1)
...
Lock-Free Queue (Priority N)
ROT
MSCM Interrupt Router
330
DRAM
Ring Index
CAN Data
0
id(0x0007), gggg
1
id(0x0020), dddd
2
id(0x0010), cccc
14
id(0x0003), aaaa
732a
3170
738aa
MCU Core0
SWC
IPC Handler
Interrupt Mitigator
Data Throttling Handler
QoS Handler
IMa
DTa
QHa
314
317a
738ab
MCU Core1
IMb
DTb
QHb
314b

FIG.9A

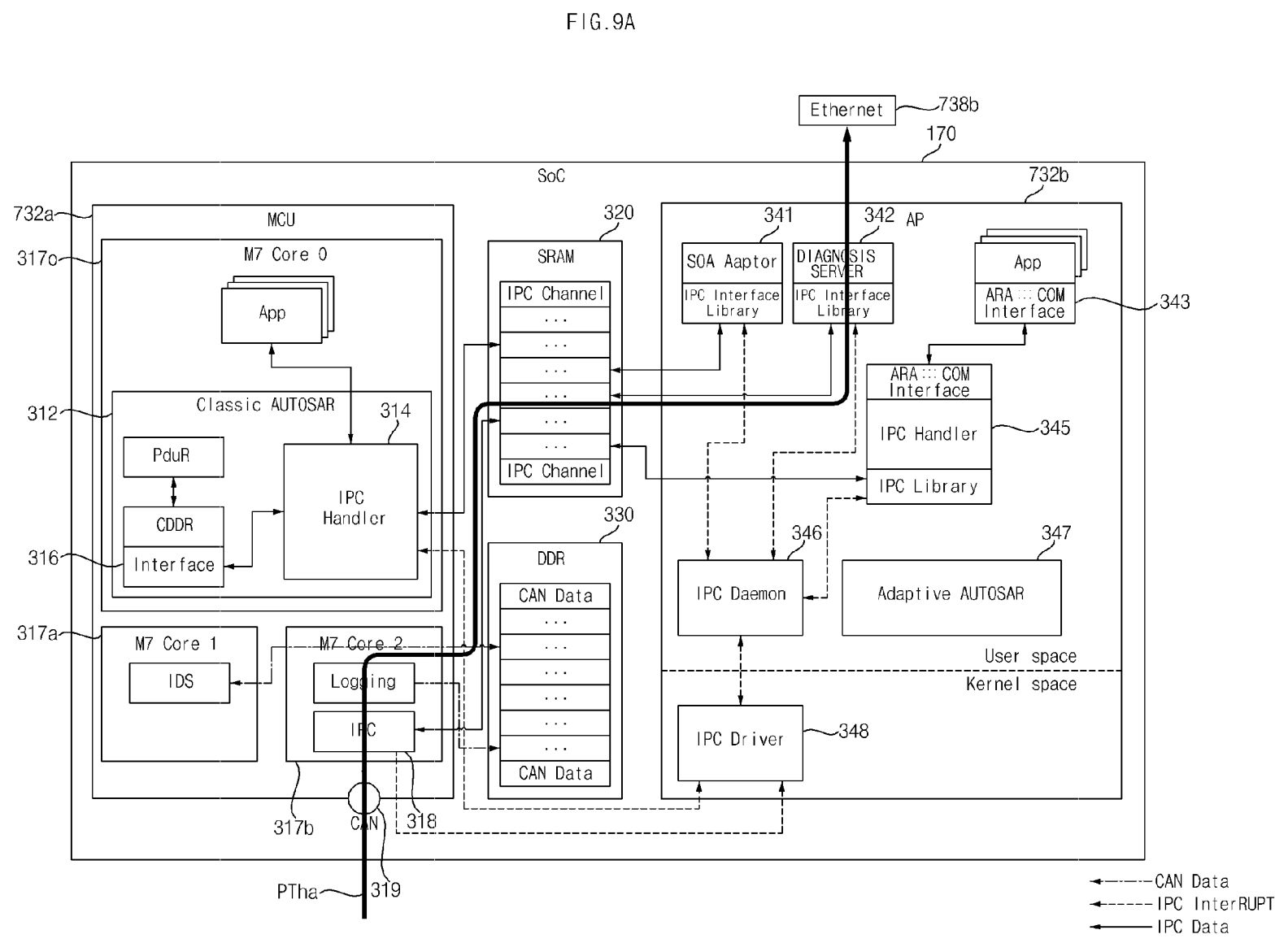

SoC
170
738b
Ethernet
AP
732b
App
ARA::COM Interface
343
ARA::COM Interface
IPC Handler
IPC Library
345
Adaptive AUTOSAR
347
User space
Kernel space
342
DIAGNOSIS SERVER
IPC Interface Library
341
SOA Aaptor
IPC Interface Library
346
IPC Daemon
348
IPC Driver
320
SRAM
IPC Channel
IPC Channel
330
DDR
CAN Data
CAN Data
MCU
M7 Core 0
App
Classic AUTOSAR
314
IPC Handler
PduR
CDDR
Interface
M7 Core 2
Logging
IPC
318
CAN
319
PTha
317b
M7 Core 1
IDS
732a
317c
312
316
317a CAN Data
IPC InterRUPT
IPC Data

FIG.10A

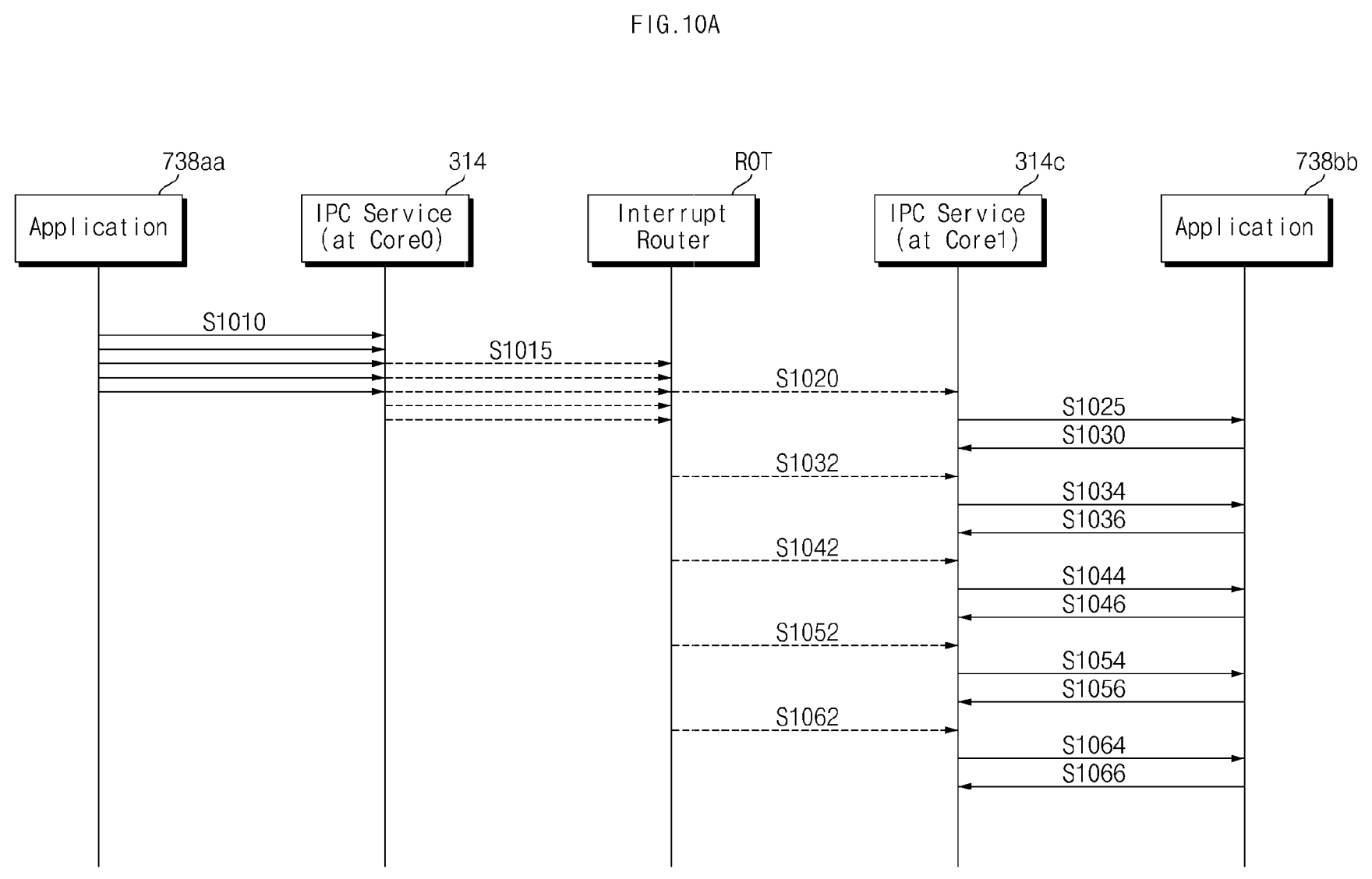

738aa Application
314 IPC Service (at Core0)
ROT Interrupt Router
314c IPC Service (at Core1)
738bb Application S1010
S1015
S1020
S1025
S1030
S1032
S1034
S1036
S1042
S1044
S1046
S1052
S1054
S1056
S1062
S1064
S1066

738aa
Application
314
IPC Service (at Core0)
ROT
Interrupt Router
314c
IPC Service (at Core1)
738bb
Application
S1010b
S1015b
S1020b
S1070
S1072
SHM
508
S1074
S1076
S1078
S1080
S1082

FIG.10C

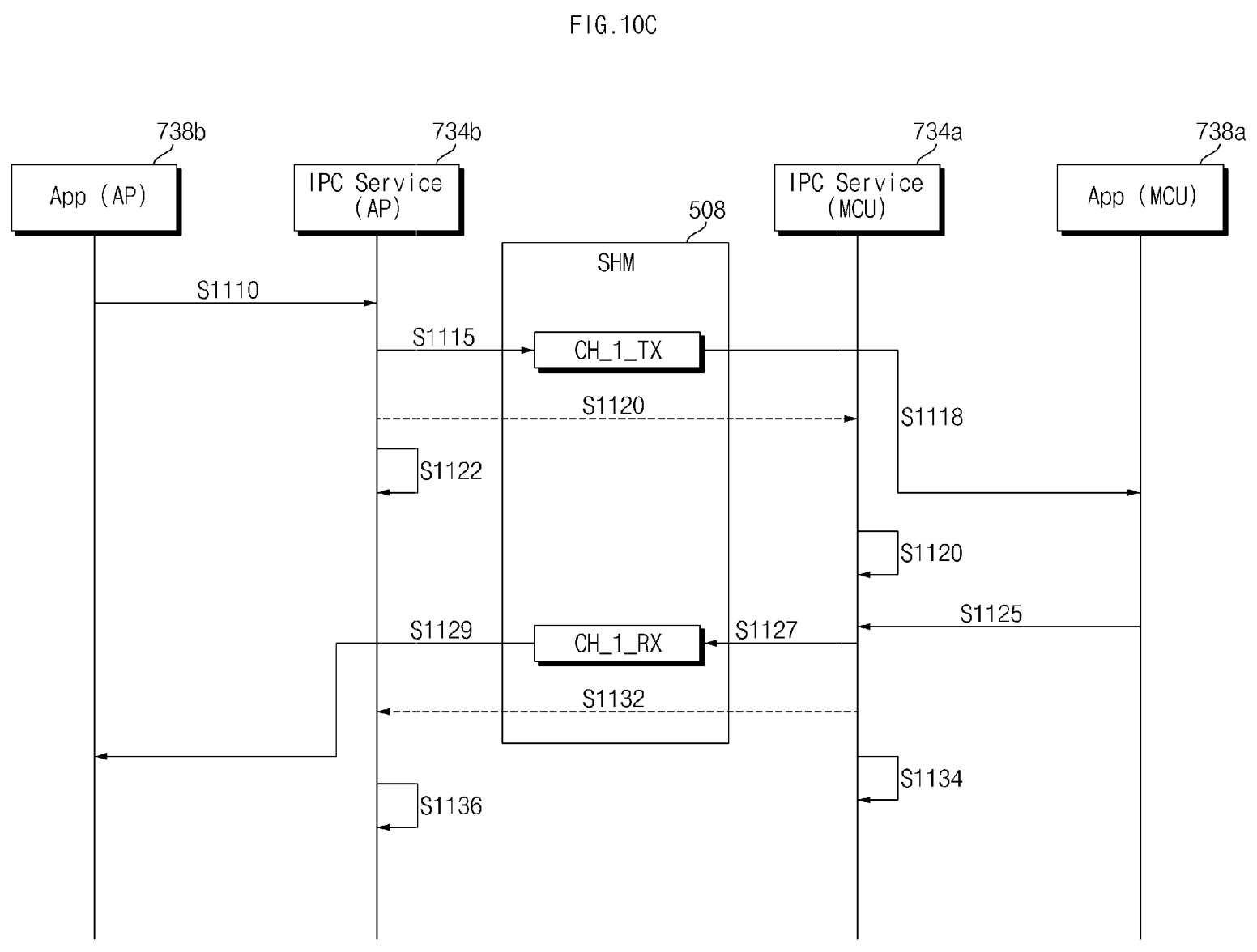

738a App (MCU)
734a IPC Service (MCU)
508 SHM
CH_1_TX
CH_1_RX
734b IPC Service (AP)
738b App (AP)
S1110
S1115
S1118
S1120
S1120
S1122
S1125
S1127
S1129
S1132
S1134
S1136

732b
1170
1172
Diag. Service
IPC Interface
User
Kernel
ROTp
ROTm
1168
1169
VDS
IPC Interface
1164
1165
System Manager
IPC Interface
1162
IPC Server
eventfd
348
IPCF Driver (ipc-shm-uio.ko)
508
SHM
MMa
1182
MMb
1184
ROTb
ROTc
1152
732a
IPC Server
IPCF Driver
1154
734a
ROTa
312
1158
1156
MCU System Manager
1159
AP Diag.
ROTb
RTE (Classic AUTOSAR)
PDURouter
MCU
: IPC Data
: Diag. Data
: IPC Interrupt
: IPC Notify

SIGNAL PROCESSING DEVICE AND VEHICLE COMMUNICATION DEVICE INCLUDING THE SAME

CROSS REFERENCE TO RELATED APPLICATIONS

This application is the National Phase of PCT International Application No. PCT/KR2022/009478, filed on Jun. 30, 2022, which claims priority under 35 U.S.C. 119(a) to Patent Application No. 10-2021-0086549, filed in the Republic of Korea on Jul. 1, 2021, all of which are hereby expressly incorporated by reference into the present application.

BACKGROUND

1. Technical Field

The present disclosure relates to a signal processing device and a vehicle communication device including the same, and more particularly to a signal processing device capable of reducing latency and performing high-speed data transmission during inter-processor communication, and a vehicle communication device including the signal processing device.

2. Description of the Related Art

A vehicle is a machine that allows a user to move in a desired direction. A representative example of the vehicle is a car.

Meanwhile, a vehicle communication device is mounted in the vehicle for user convenience.

Particularly, a gateway which is a high-speed router may be used for data communication between a plurality of in-vehicle processors.

Korean Patent No. 10-1020948 (hereinafter referred to as "related art") relates to a vehicle network gateway and a network system, in which a mobile terminal supports wireless LAN via the internet by using a vehicle telematics module.

However, the related art has a problem in that the vehicle network gateway uses communication protocols, such as UART, SPI, etc., such that due to a low bandwidth and unnecessary memory copy, real-time data transmission and large data transmission may not be accomplished.

SUMMARY

It is an object of the present disclosure to provide a signal processing device capable of reducing latency and performing high-speed data transmission during inter-processor communication, and a vehicle communication device including the signal processing device.

Meanwhile, it is another object of the present disclosure to provide a signal processing device capable of rapidly transmitting messages based on different communication schemes, and a vehicle communication device including the signal processing device.

Meanwhile, it is yet another object of the present disclosure to provide a signal processing device capable of efficiently using a processor based on an interrupt signal, and a vehicle communication device including the signal processing device.

Meanwhile, it is yet another object of the present disclosure to provide a signal processing device capable of operating without a locking mechanism for a processor, and a vehicle communication device including the signal processing device.

Meanwhile, it is further another object of the present disclosure to provide a signal processing device capable of significantly reducing data transmission loss based on a processor clock or memory access performance, and a vehicle communication device including the signal processing device.

Meanwhile, it is yet another object of the present disclosure to provide a signal processing device capable of ensuring real-time transmission of a high priority data or event during inter-processor communication, and a vehicle communication device including the signal processing device.

Meanwhile, it is further another object of the present disclosure to provide a signal processing device capable of rapidly processing real-time data and large data, and a vehicle communication device including the signal processing device.

In accordance with an aspect of the present disclosure, the above and other objectives can be accomplished by providing a signal processing device and a vehicle communication device including the same, which include: a first processor configured to receive a first message based on a first communication scheme and to perform signal processing of the received first message, wherein the first message includes a sensor signal in a vehicle; a second processor configured to receive a second message based on a second communication scheme and to perform signal processing of the received second message, wherein the second message includes a communication message received from an external source; and a shared memory configured to operate to transmit the first message or the second message between the first processor and the second processor, wherein the first processor or the second processor is configured to receive the first message or the second message stored in the shared memory based on an interrupt signal.

Meanwhile, the signal processing device may further include an interrupt router configured to output an interrupt signal to the first processor or the second processor.

Meanwhile, the interrupt router may be configured to output an interrupt signal to each core of the first processor or each core of the second processor.

Meanwhile, the interrupt router may be configured to dynamically adjust the number of triggering of the interrupt signal.

Meanwhile, the first processor or the second processor may operate based on a lock-free queue.

Meanwhile, the first processor or the second processor may be configured to transmit or receive the first message or the second message based on a dynamic bandwidth according to a clock or memory access performance.

Meanwhile, the first processor may be configured to transmit the first message to the shared memory based on a first dynamic bandwidth according to a first clock; and the second processor may be configured to transmit the second message to the shared memory based on a second dynamic bandwidth according to a second clock.

Meanwhile, the first processor may be configured to execute a first server and a first driver for inter-processor communication (IPC), wherein the second processor may be configured to execute a second server and a second driver for the inter-processor communication (IPC), wherein the interrupt signal may be transmitted between the first server and the second server, and the first server or the second server may be configured to transmit or receive data to or from the shared memory.

Meanwhile, an application executed in the second processor may be configured to access the shared memory to receive the first message.

Meanwhile, an application executed in the first processor may be configured to access the shared memory to receive the second message.

Meanwhile, the shared memory may be divided into areas based on each application executed in the first processor or the second processor.

Meanwhile, the interrupt router may be configured to: in response to a transmitted message being event-based data, operate in an interrupt-driven mode; and in response to the transmitted message being periodic data, operate in a polling mode.

Meanwhile, the first processor may be configured to: in response to the transmitted first message being event-based data, operate in an interrupt-driven mode; and in response to the transmitted first message being periodic data, operate in a polling mode.

Meanwhile, in response to the second message including update data or data for reprogramming, the second processor may be configured to divide the data and transmit the divided data to the first memory.

Meanwhile, the first processor may be configured to receive the first message through a plurality of channels and transmit the first message through the shared memory.

Meanwhile, the second processor may be configured to receive the first message through the shared memory, to convert the first message into data based on the second communication scheme, and to transmit the converted data to an external server.

Meanwhile, the first processor may include a first manager including a first cache for inter-processor communication (IPC); and the second processor may include a second manager including a timer and a second cache for the IPC.

Meanwhile, upon receiving the first message corresponding to a subscription request, the first processor may store the first message in the first cache or may manage the first message, and upon receiving the first message, the first processor may compare the first message with a value stored in the first cache, and in response to a difference between the first message and the stored value being greater than or equal to a predetermined value, the first processor may transmit the first message to the second processor through the IPC.

Meanwhile, a signal processing device and a vehicle communication device including the same according to an embodiment of the present disclosure may further include: a first memory including an IPC channel; and a second memory configured to store sensor data including vehicle speed data, wherein the shared memory may be selected from the first memory or the second memory based on an available size of the first memory or the second memory.

Effects of the Disclosure

A signal processing device and a vehicle communication device including the same according to an embodiment of the present disclosure include: a first processor configured to receive a first message based on a first communication scheme and to perform signal processing of the received first message, wherein the first message includes a sensor signal in a vehicle; a second processor configured to receive a second message based on a second communication scheme and to perform signal processing of the received second message, wherein the second message includes a communication message received from an external source; and a shared memory configured to operate to transmit the first message or the second message between the first processor and the second processor, wherein the first processor or the second processor is configured to receive the first message or the second message stored in the shared memory based on an interrupt signal. Accordingly, latency may be reduced and high-speed data transmission may be performed during inter-processor communication. Particularly, messages based on different communication schemes may be rapidly transmitted.

Meanwhile, the signal processing device may further include an interrupt router configured to output an interrupt signal to the first processor or the second processor.

Meanwhile, the interrupt router may be configured to output an interrupt signal to each core of the first processor or each core of the second processor. Accordingly, the processor may be used efficiently based on the interrupt signal.

Meanwhile, the interrupt router may be configured to dynamically adjust the number of triggering of the interrupt signal. Accordingly, the processor may be used efficiently based on the interrupt signal.

Meanwhile, the first processor or the second processor may operate based on a lock-free queue, thereby allowing operation without a locking mechanism for the processor.

Meanwhile, the first processor or the second processor may be configured to transmit or receive the first message or the second message based on a dynamic bandwidth according to a clock or memory access performance. Accordingly, latency may be reduced and high-speed data transmission may be performed during inter-processor communication. Further, data transmission loss may be significantly reduced based on a processor clock or memory access performance.

Meanwhile, the first processor may be configured to transmit the first message to the shared memory based on a first dynamic bandwidth according to a first clock; and the second processor may be configured to transmit the second message to the shared memory based on a second dynamic bandwidth according to a second clock. Accordingly, latency may be reduced and high-speed data transmission may be performed during inter-processor communication. Further, data transmission loss may be significantly reduced based on a processor clock or memory access performance.

Meanwhile, the first processor may be configured to execute a first server and a first driver for inter-processor communication (IPC), wherein the second processor may be configured to execute a second server and a second driver for the inter-processor communication (IPC), wherein the interrupt signal may be transmitted between the first server and the second server, and the first server or the second server may be configured to transmit or receive data to or from the shared memory. Accordingly, latency may be reduced and high-speed data transmission may be performed during inter-processor communication.

Meanwhile, an application executed in the second processor may be configured to access the shared memory to receive the first message. Accordingly, messages based on different communication schemes may be rapidly received.

Meanwhile, an application executed in the first processor may be configured to access the shared memory to receive the second message. Accordingly, messages based on different communication schemes may be rapidly received.

Meanwhile, the shared memory may be divided into areas based on each application executed in the first processor or the second processor. Accordingly, the shared memory may be stably used.

Meanwhile, the interrupt router may be configured to: in response to a transmitted message being event-based data, operate in an interrupt-driven mode; and in response to the transmitted message being periodic data, operate in a polling mode. Accordingly, the message may be efficiently transmitted.

Meanwhile, the first processor may be configured to: in response to the transmitted first message being event-based data, operate in an interrupt-driven mode; and in response to the transmitted first message being periodic data, operate in a polling mode. Accordingly, the message may be efficiently transmitted.

Meanwhile, in response to the second message including update data or data for reprogramming, the second processor may be configured to divide the data and transmit the divided data to the first memory. Accordingly, it is possible to prevent performance degradation due to an excessive interrupt.

Meanwhile, the first processor may be configured to receive the first message through a plurality of channels and transmit the first message through the shared memory. Accordingly, the message may be efficiently transmitted.

Meanwhile, the second processor may be configured to receive the first message through the shared memory, to convert the first message into data based on the second communication scheme, and to transmit the converted data to an external server. Accordingly, the message may be efficiently transmitted.

Meanwhile, the first processor may include a first manager including a first cache for inter-processor communication (IPC); and the second processor may include a second manager including a timer and a second cache for the IPC. Accordingly, latency may be reduced and high-speed data transmission may be performed during inter-processor communication.

Meanwhile, upon receiving the first message corresponding to a subscription request, the first processor may store the first message in the first cache or may manage the first message, and upon receiving the first message, the first processor may compare the first message with a value stored in the first cache, and in response to a difference between the first message and the stored value being greater than or equal to a predetermined value, the first processor may transmit the first message to the second processor through the IPC. Accordingly, by minimizing cache occupancy or buffer occupancy of the same data, latency may be reduced and high-speed data transmission may be performed during the inter-processor communication.

Meanwhile, a signal processing device and a vehicle communication device including the same according to an embodiment of the present disclosure may further include: a first memory including an IPC channel; and a second memory configured to store sensor data including vehicle speed data, wherein the shared memory may be selected from the first memory or the second memory based on an available size of the first memory or the second memory. Accordingly, the shared memory may be efficiently used.

BRIEF DESCRIPTION OF THE DRAWINGS

FIG. 3 is an internal block diagram illustrating a signal processing device according to an embodiment of the present disclosure;

FIG. 8 is another example of an internal block diagram illustrating a vehicle communication device according to an embodiment of the present disclosure.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
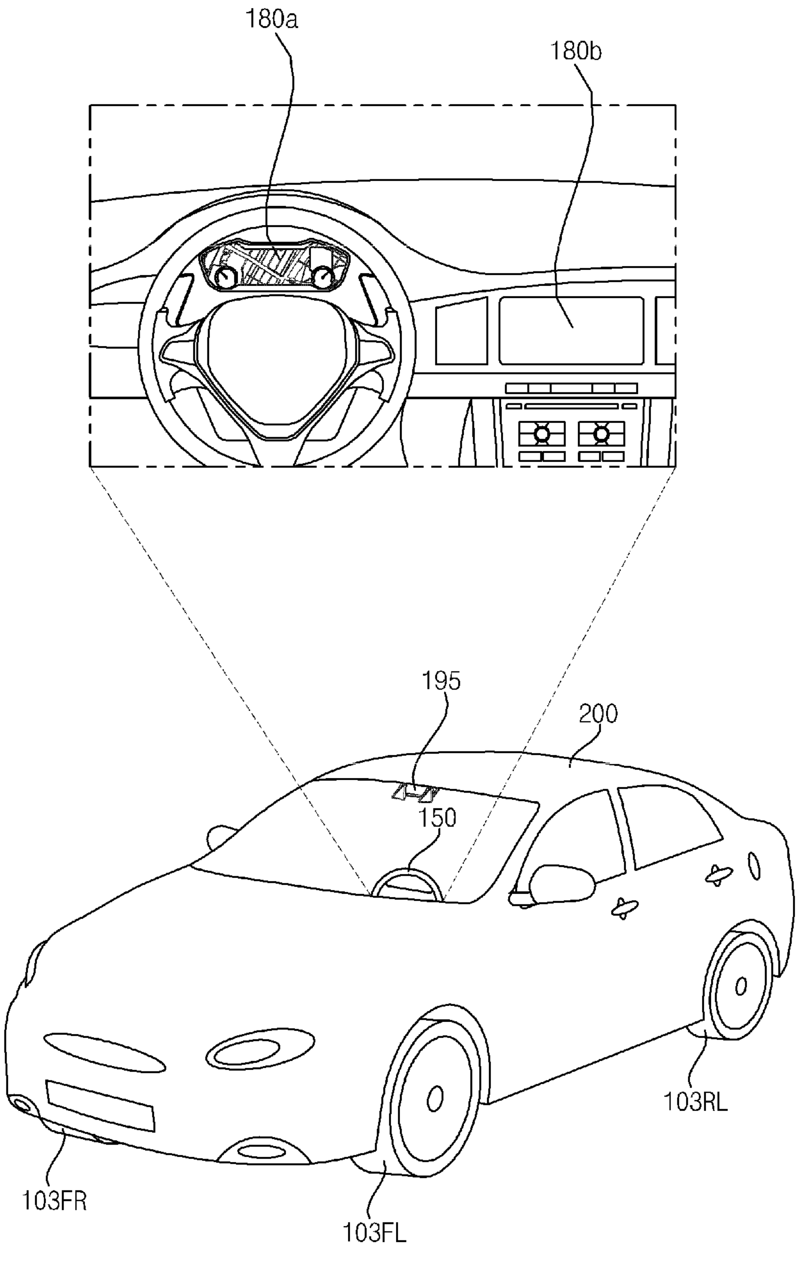
FIG. 1 is a view showing an example of the exterior and interior of a vehicle.

FIG. 1 is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180*a* and 180*b* configured to display images and information.

In FIG. 1, a cluster display 180*a* and an audio video navigation (AVN) display 180*b* are illustrated as the plurality of displays 180*a* and 180*b*. In addition, a head up display (HUD) may also be used.

Meanwhile, the audio video navigation (AVN) display 180*b* may also be called a center information display.

Meanwhile, according to the embodiment of the present disclosure, in a vehicle display apparatus 100 including a plurality of displays 180*a* and 180*b*, the plurality of displays 180*a* and 180*b* may display the same images in a synchronized state.

In particular, a signal processing device 170 in the vehicle display apparatus 100 may transmit the same data to a plurality of virtual machines in a synchronized state, and may be configured to display the same images on the displays.

Meanwhile, the 200 vehicle described in this specification may be a concept including all of a vehicle having an engine as a power source, a hybrid vehicle having an engine and an electric motor as a power source, and an electric vehicle having an electric motor as a power source.

Figure 2A:
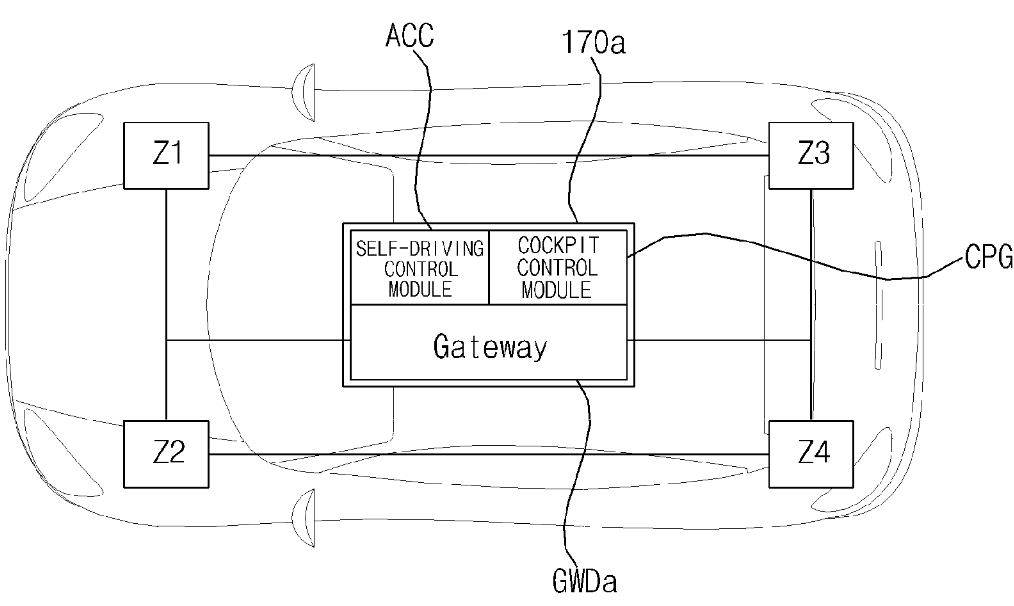
FIGS. 2A to 2C are diagrams illustrating various architectures of a vehicle communication gateway according to an embodiment of the present disclosure.
Figure 2B:
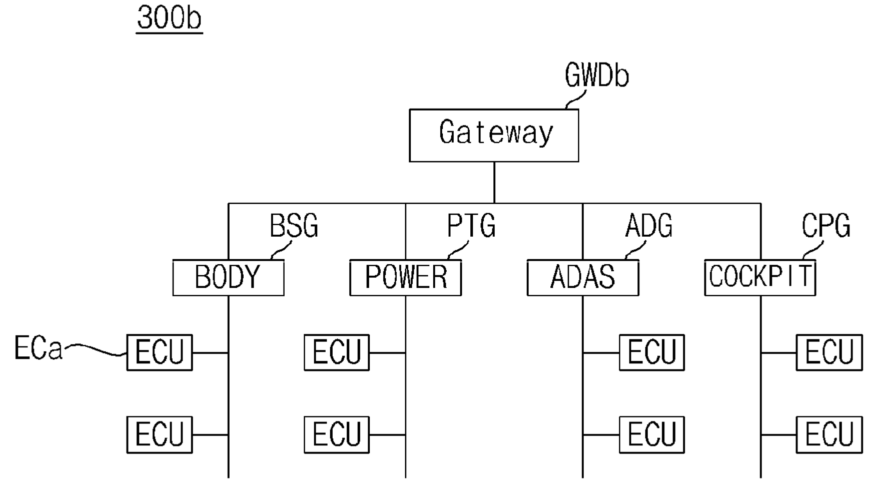
Figure 2C:
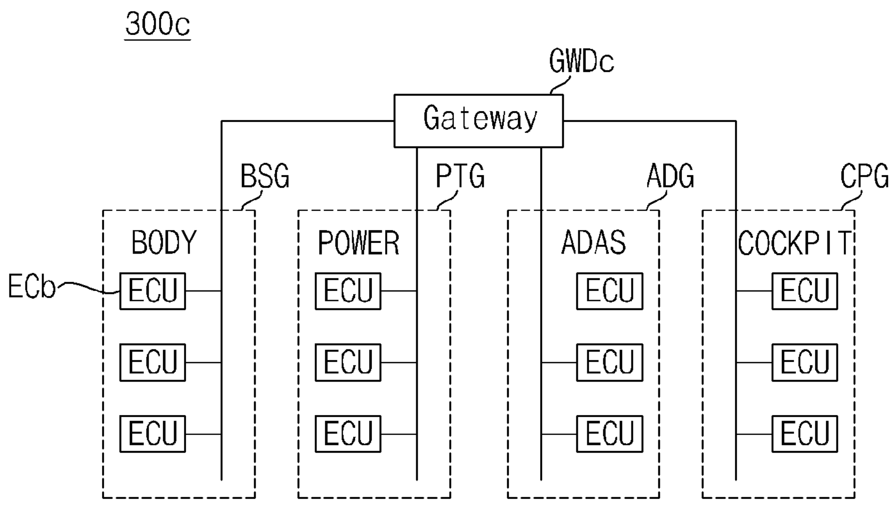

FIGS. 2A to 2C are diagrams illustrating various architectures of a vehicle communication gateway according to an embodiment of the present disclosure.

First, FIG. 2A is a diagram illustrating a first architecture of a vehicle communication gateway according to an embodiment of the present disclosure.

Referring to the drawing, the first architecture 300*a* may correspond to a zone-based architecture.

Accordingly, in-vehicle sensor devices and processors may be mounted in each of a plurality of zones Z1 to Z4, and a signal processing device 170*a* including a vehicle communication gateway GWDa may be disposed at the center of the plurality of zones Z1 to Z4.

Meanwhile, the signal processing device 170*a* may further include a self-driving control module ACC, a cockpit control module CPG, etc., in addition to the vehicle communication gateway GWDa.

The vehicle communication gateway GWDa in the signal processing device 170*a* may be a High Performance Computing (HPC) gateway.

That is, as an integrated HPC gateway, the signal processing device 170*a* of FIG. 2A may exchange data with an external communication module (not shown) or processors (not shown) in the plurality of zones Z1 to Z4.

FIG. 2B is a diagram illustrating a second architecture of a vehicle communication gateway according to an embodiment of the present disclosure.

Referring to the drawing, a second architecture 300*b* may correspond to a domain integrated architecture.

Accordingly, a body chassis control module (BSG), a power control module (PTG), an ADAS control module (ADG), and a cockpit control module (CPG) are connected in parallel to a gateway GWDb, and a plurality of processors ECU may be electrically connected to the respective modules BSG, PTG, ADG, and CPG.

Meanwhile, the respective processors ECU may be connected to the gateway GWDb while being integrated therein.

Meanwhile, the signal processing device 170 including the gateway GWDb of FIG. 2B may function as a domain integrated signal processing device.

FIG. 2C is a diagram illustrating a third architecture of a vehicle communication gateway according to an embodiment of the present disclosure.

Referring to the drawing, a third architecture 300*c* may correspond to a distributed architecture.

Accordingly, the body chassis control module (BSG), the power control module (PTG), the ADAS control module (ADG), and the cockpit control module (CPG) are connected in parallel to a gateway GWDc, and particularly a plurality of processors ECU in the respective control modules may be electrically connected in parallel to the gateway GWDc.

Upon comparison with FIG. 2B, the third architecture has a difference in that the respective processors ECU are connected directly to the gateway GWDc without being connected to another module.

Meanwhile, the signal processing device 170 including the gateway GWDc of FIG. 2C functions as a distributed signal processing device.

FIG. 3 is an internal block diagram illustrating a signal processing device according to an embodiment of the present disclosure.

Referring to the drawing, the signal processing device 170 according to an embodiment of the present disclosure includes: a first processor 732*a*, which based on a first communication scheme, is configured to receive a first message including a sensor signal in a vehicle and to perform signal processing on the received first message; and a second processor 732*b*, which based a second communication scheme, is configured to receive a second message including a communication message received from an external source and to perform signal processing of the received second message.

In this case, the second communication scheme may have a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message.

Meanwhile, the signal processing device 170 according to an embodiment of the present disclosure further includes: a first memory 320 having an IPC channel; and a second memory 330 storing sensor data including vehicle speed data.

For example, the first memory 320 may be a Static RAM (SRAM), and the second memory 330 may be a DDR memory. Particularly, the second memory 330 may be a Double data rate synchronous dynamic random access memory (DDR SDRAM).

Meanwhile, the signal processing device 170 according to an embodiment of the present disclosure includes a shared memory 508 which operates for transmitting the first message or the second message between the first processor 732*a* and the second processor 732*b*.

As described above, by performing inter-processor communication using the shared memory 508 during the communication between the first processor 732*a* and the second processor 732*b*, latency may be reduced and high-speed data transmission may be performed during inter-processor communication.

Meanwhile, it is desired that the shared memory 508 is provided in the first memory 320. Accordingly, latency may be reduced and high-speed data transmission may be performed during inter-processor communication.

Meanwhile, the first processor 732*a* may include a plurality of processor cores 317*o*, 317*a*, and 317*b* disposed therein.

Meanwhile, the first processor 732*a* may further include an interface 319 for receiving the CAN message from external vehicle sensors.

For example, a first processor core 317*o* included in the first processor 732*a* may execute a plurality of applications or may execute a first AUTomotive Open System Architecture (AUTOSAR) 312.

Particularly, by executing a second AUTOSAR 312, the first processor core 317*o* may execute an inter-processor communication (IPC) handler 314.

Meanwhile, the IPC handler 314 may exchange data with the first memory 320 or may exchange IPC data with an application executed on the core 317*o*.

Meanwhile, the IPC handler 314 may exchange an interrupt signal with an IPC driver 348 included in the second processor 732*b*.

Meanwhile, a second processor core 317*a* included in the first processor 732*a* may execute IDS and may receive CAN data from the second memory 330.

Meanwhile, a third core 317*b* included in the first processor 732*a* may execute Logging, and may store the CAN data, received through the interface 319, in the second memory 330.

Meanwhile, the third processor core 317*b* included in the first processor 732*a* may execute an IPC module 318 to exchange IPC data with the first memory 320.

Meanwhile, the third processor core 317*b* included in the first processor 732*a* may transmit an interrupt signal to the IPC driver 348 in the second processor 732*b*.

The first memory 320 may exchange the IPC data with the IPC handler 314 or the IPC module 318.

Meanwhile, the second processor 732*b* may execute an application 343, the IPC handler 345, an IPC daemon 346, the IPC driver 348, and the like.

Meanwhile, the second processor 732*b* may further execute a service oriented architecture (SOA) adapter 341, a diagnosis server 342, and the second AUTOSAR 347.

The second AUTOSAR 347 may be an adaptive AUTOSAR, and the first AUTOSAR 312 may be a classic AUTOSAR.

The IPC daemon 346 may exchange an interrupt signal with the SOA adapter 341, the diagnosis server 342, the IPC handler 345, the IPC driver 348, and the like.

Meanwhile, the first memory 320 may exchange IPC data with the SOA adapter 341, the diagnosis server 342, the IPC handler 345, and the like.

Meanwhile, the IPC data described with reference to FIG. 3 may be the CAN message or Ethernet message.

Meanwhile, the IPC handler 345 may function as a service provider providing data such as diagnosis, firmware, upgrade, system information, etc., based on the second AUTOSAR 347.

Meanwhile, although not illustrated in FIG. 3, the first processor 732*a* implements a message router (not shown), and the message router may convert a frame of the first message, such as the CAN message, into a frame format of the second message, such as the Ethernet message, and may transmit the converted message to the second processor 732*b*.

Meanwhile, although not illustrated in FIG. 3, the first processor 732*a* may further implement a CAN driver (not shown) and a CAN interface (not shown).

For example, the CAN interface (not shown) may be implemented by a total of 16 channels, with eight channels of each of a fourth processor core (not shown) and a fifth processor core (not shown) in the first processor 732*a*.

In this case, a first CAN interface (not shown) implemented on the fourth processor core (not shown) may correspond to a first queue (PTb) during inter-processor communication, and a second CAN interface (not shown) implemented on the fifth processor core (not shown) may correspond to a second queue (PTb), having a higher priority than the first queue (PTb), during inter-processor communication.

Figure 4A:
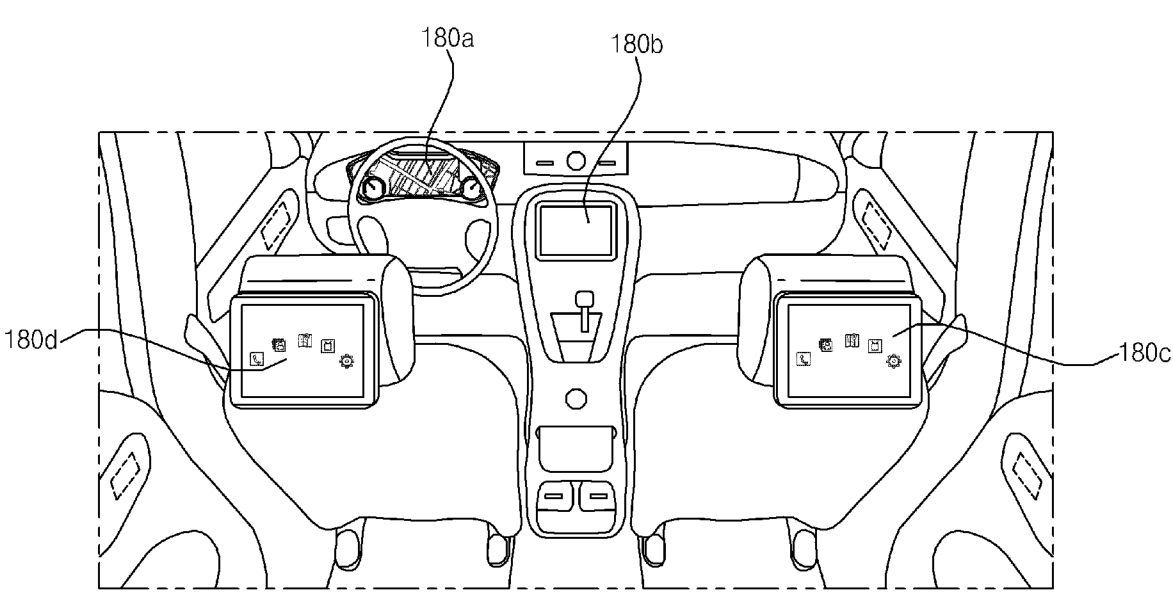
FIG. 4A is a diagram illustrating an example of an arrangement of a vehicle display apparatus in a vehicle according to an embodiment of the present disclosure.

FIG. 4A is a diagram illustrating an example of an arrangement of a vehicle display apparatus in a vehicle according to an embodiment of the present disclosure.

Referring to the figure, a cluster display 180*a*, an audio video navigation (AVN) display 180*b*, rear seat entertainment displays 180*c* and 180*d*, and a rear-view mirror display (not shown) may be mounted in the vehicle.

Figure 4B:
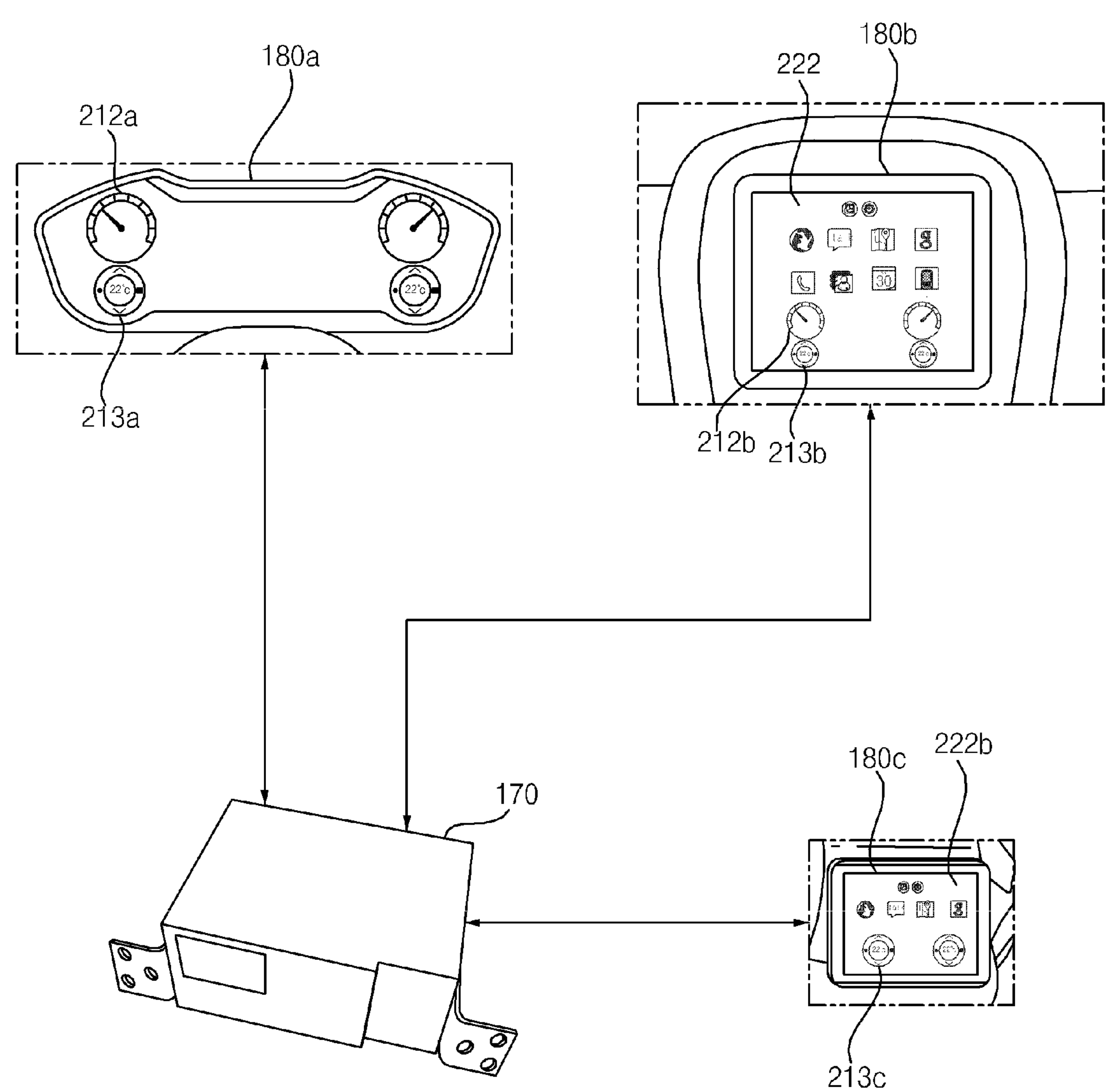
FIG. 4B is a diagram illustrating another example of an arrangement of a vehicle display apparatus in a vehicle according to an embodiment of the present disclosure.

FIG. 4B is a diagram illustrating another example of an arrangement of a vehicle display apparatus in a vehicle according to an embodiment of the present disclosure.

The vehicle display apparatus 100 according to the embodiment of the present disclosure may include a plurality of displays 180*a* and 180*b* and a signal processing device 170 configured to perform signal processing in order to display images and information on the plurality of displays 180*a* and 180*b*.

The first display 180*a*, which is one of the plurality of displays 180*a* and 180*b*, may be a cluster display 180*a* configured to display a driving state and operation information, and the second display 180*b* may be an audio video navigation (AVN) display 180*b* configured to display vehicle driving information, a navigation map, various kinds of entertainment information, or an image.

The signal processing device 170 may have a processor 175 provided therein, and first to third virtual machines (not shown) may be executed by a hypervisor 505 in the processor 175.

The second virtual machine (not shown) may be operated for the first display 180*a*, and the third virtual machine (not shown) may be operated for the second display 180*b*.

Meanwhile, the first virtual machine (not shown) in the processor 175 may be configured to set a shared memory 508 based on the hypervisor 505 for transmission of the same data to the second virtual machine (not shown) and the third virtual machine (not shown). Consequently, the first display 180*a* and the second display 180*b* in the vehicle may display the same information or the same images in a synchronized state.

Meanwhile, the first virtual machine (not shown) in the processor 175 shares at least some of data with the second virtual machine (not shown) and the third virtual machine (not shown) for divided processing of data. Consequently, the plurality of virtual machines for the plurality of displays in the vehicle may divide and process data.

Meanwhile, the first virtual machine (not shown) in the processor 175 may receive and process wheel speed sensor data of the vehicle, and may transmit the processed wheel speed sensor data to at least one of the second virtual machine (not shown) or the third virtual machine (not shown). Consequently, at least one virtual machine may share the wheel speed sensor data of the vehicle.

Meanwhile, the vehicle display apparatus 100 according to the embodiment of the present disclosure may further include a rear seat entertainment (RSE) display 180*c* configured to display driving state information, simple navigation information, various kinds of entertainment information, or an image.

The signal processing device 170 may further execute a fourth virtual machine (not shown), in addition to the first to third virtual machines (not shown), on the hypervisor 505 in the processor 175 to control the RSE display 180*c*.

Consequently, it is possible to control various displays 180*a* to 180*c* using a single signal processing device 170.

Meanwhile, some of the plurality of displays 180*a* to 180*c* may be operated based on a Linux Operating System (OS), and others may be operated based on a Web Operating System (OS).

The signal processing device 170 according to the embodiment of the present disclosure may be configured to display the same information or the same images in a synchronized state on the displays 180*a* to 180*c* to be operated under various operating systems.

Meanwhile, FIG. 4B illustrates that a vehicle speed indicator 212*a* and an in-vehicle temperature indicator 213*a* are displayed on the first display 180*a*, a home screen 222 including a plurality of applications, a vehicle speed indicator 212*b*, and an in-vehicle temperature indicator 213*b* is displayed on the second display 180*b*, and a second home screen 222*b* including a plurality of applications and an in-vehicle temperature indicator 213*c* is displayed on the third display 180*c*.

Figure 5:
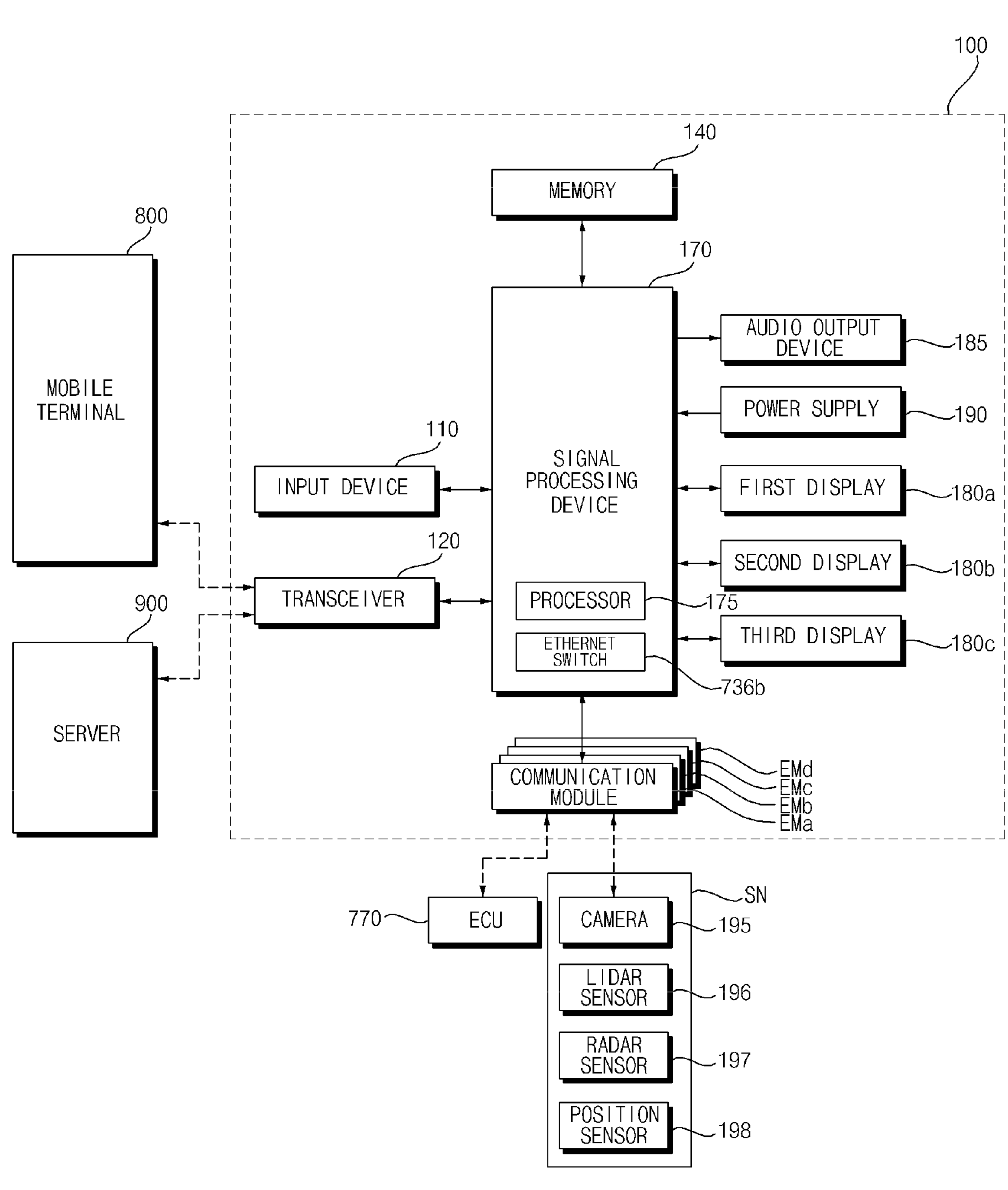
FIG. 5 is an internal block diagram illustrating the vehicle display apparatus of FIG. 4B.

FIG. 5 is an internal block diagram illustrating the vehicle display apparatus of FIG. 4B according to the embodiment of the present disclosure.

Referring to the figure, the vehicle display apparatus 100 according to the embodiment of the present disclosure may include an input device 110, a transceiver 120 for communication with an external device, a plurality of communication modules EMa to EMd for internal communication, a memory 140, a signal processing device 170, a plurality of displays 180*a* to 180*c*, an audio output device 185, and a power supply 190.

The plurality of communication modules EMa to EMd may be disposed in a plurality of zones Z1 to Z4, respectively, in FIG. 2A.

Meanwhile, the signal processing device 170 may be provided therein with an Ethernet switch 736*b* for data communication with the respective communication modules EM1 to EM4.

The respective communication modules EM1 to EM4 may perform data communication with a plurality of sensor devices SN or an ECU 770.

Meanwhile, each of the plurality of sensor devices SN may include a camera 195, a lidar sensor 196, a radar sensor 197, or a position sensor 198.

The input device 110 may include a physical button or pad for button input or touch input.

Meanwhile, the input device 110 may include a microphone (not shown) for user voice input.

The transceiver 120 may wirelessly exchange data with a mobile terminal 400 or a server 900.

In particular, the transceiver 120 may wirelessly exchange data with a mobile terminal of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 400 or the server 900. To this end, the transceiver 120 may include a mobile communication module (not shown).

The plurality of communication modules EM1 to EM4 may receive sensor information from an electronic control unit (ECU) 770 or a sensor device SN, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor.

Meanwhile, the position module may include a GPS module configured to receive GPS information or a position sensor 198.

Meanwhile, at least one of the plurality of communication modules EM1 to EM4 may transmit position information data sensed by the GPS module or the position sensor 198 to the signal processing device 170.

Meanwhile, at least one of the plurality of communication modules EM1 to EM4 may receive front-of-vehicle image data, side-of-vehicle image data, rear-of-vehicle image data, and obstacle-around-vehicle distance information from the camera 195, the lidar sensor 196, or the radar sensor 197, and may transmit the received information to the signal processing device 170.

The memory 140 may store various data necessary for overall operation of the vehicle display apparatus 100, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the vehicle display apparatus 100.

For example, the signal processing device 170 may include a processor 175 configured to perform signal processing for the vehicle displays 180*a* and 180*b*.

The processor 175 may execute the first to third virtual machines (not shown) on the hypervisor 505 (see FIG. 10) in the processor 175.

Among the first to third virtual machines (not shown) (see FIG. 10), the first virtual machine (not shown) may be called a server virtual machine, and the second and third virtual machines (not shown) and (not shown) may be called guest virtual machines.

For example, the first virtual machine (not shown) in the processor 175 may receive sensor data from the plurality of sensor devices, such as vehicle sensor data, position information data, camera image data, audio data, or touch input data, and may process and output the received sensor data.

As described above, the first virtual machine (not shown) may process most of the data, whereby 1:N data sharing may be achieved.

In another example, the first virtual machine (not shown) may directly receive and process CAN data, Ethernet data, audio data, radio data, USB data, and wireless communication data for the second and third virtual machines (not shown).

Further, the first virtual machine (not shown) may transmit the processed data to the second and third virtual machines (not shown).

Accordingly, only the first virtual machine (not shown), among the first to third virtual machines (not shown), may receive sensor data from the plurality of sensor devices, communication data, or external input data, and may perform signal processing, whereby load in signal processing by the other virtual machines may be reduced and 1:N data communication may be achieved, and therefore synchronization at the time of data sharing may be achieved.

Meanwhile, the first virtual machine (not shown) may be configured to write data in the shared memory 508, whereby the second virtual machine (not shown) and the third virtual machine (not shown) share the same data.

For example, the first virtual machine (not shown) may be configured to write vehicle sensor data, the position information data, the camera image data, or the touch input data in the shared memory 508, whereby the second virtual machine (not shown) and the third virtual machine (not shown) share the same data. Consequently, 1:N data sharing may be achieved.

Eventually, the first virtual machine (not shown) may process most of the data, whereby 1:N data sharing may be achieved.

Meanwhile, the first virtual machine (not shown) in the processor 175 may be configured to set the shared memory 508 based on the hypervisor 505 in order to transmit the same data to the second virtual machine (not shown) and the third virtual machine (not shown).

Meanwhile, the signal processing device 170 may process various signals, such as an audio signal, an image signal, and a data signal. To this end, the signal processing device 170 may be implemented in the form of a system on chip (SOC).

Figure 7A:
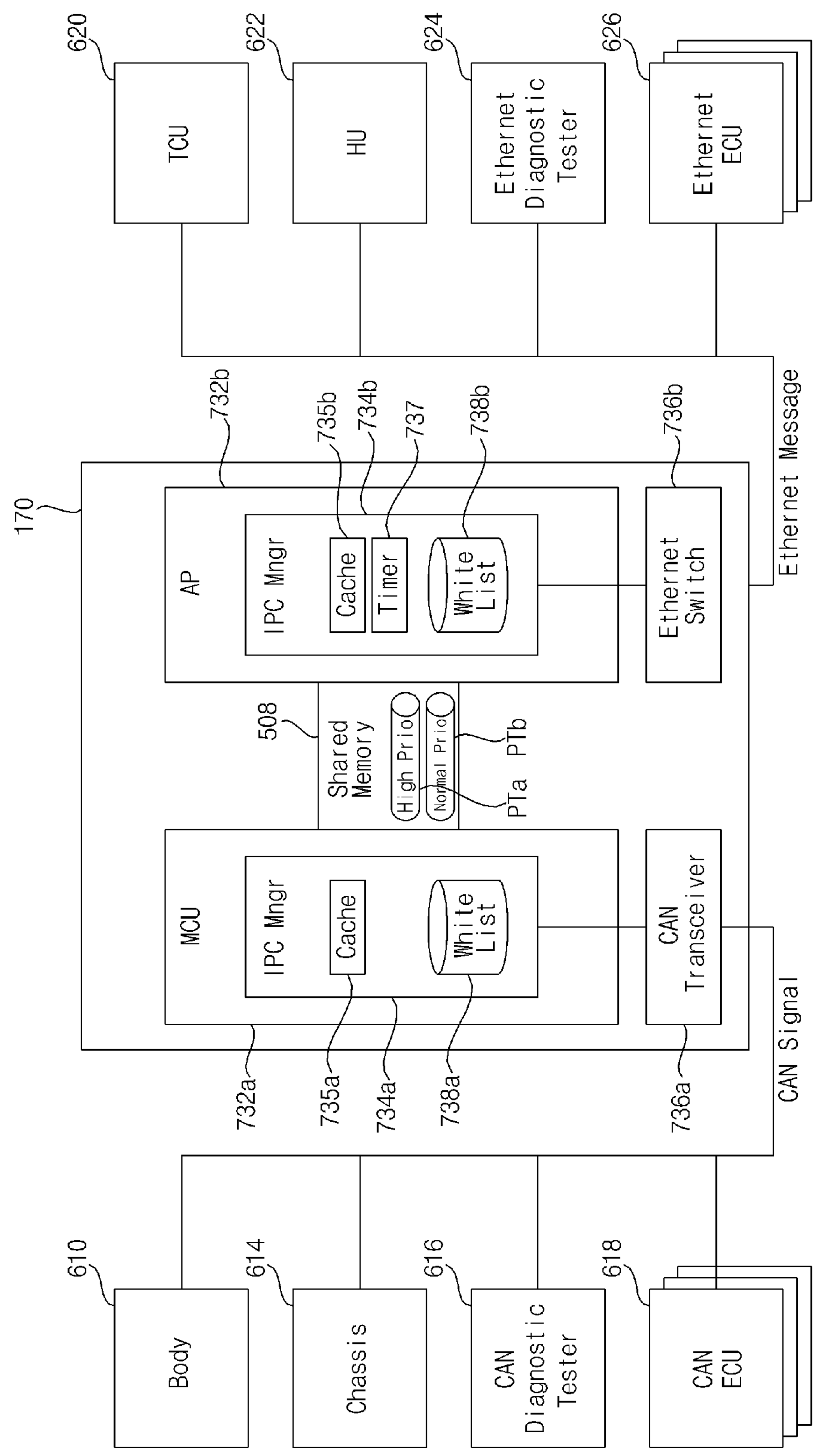
FIG. 7A is an example of an internal block diagram illustrating a vehicle communication device according to an embodiment of the present disclosure.

Meanwhile, the signal processing device 170 included in the display apparatus 100 of FIG. 5 may be the same as the signal processing device 170 of a vehicle communication device 700 of FIG. 7A and the like.

Figure 6A:
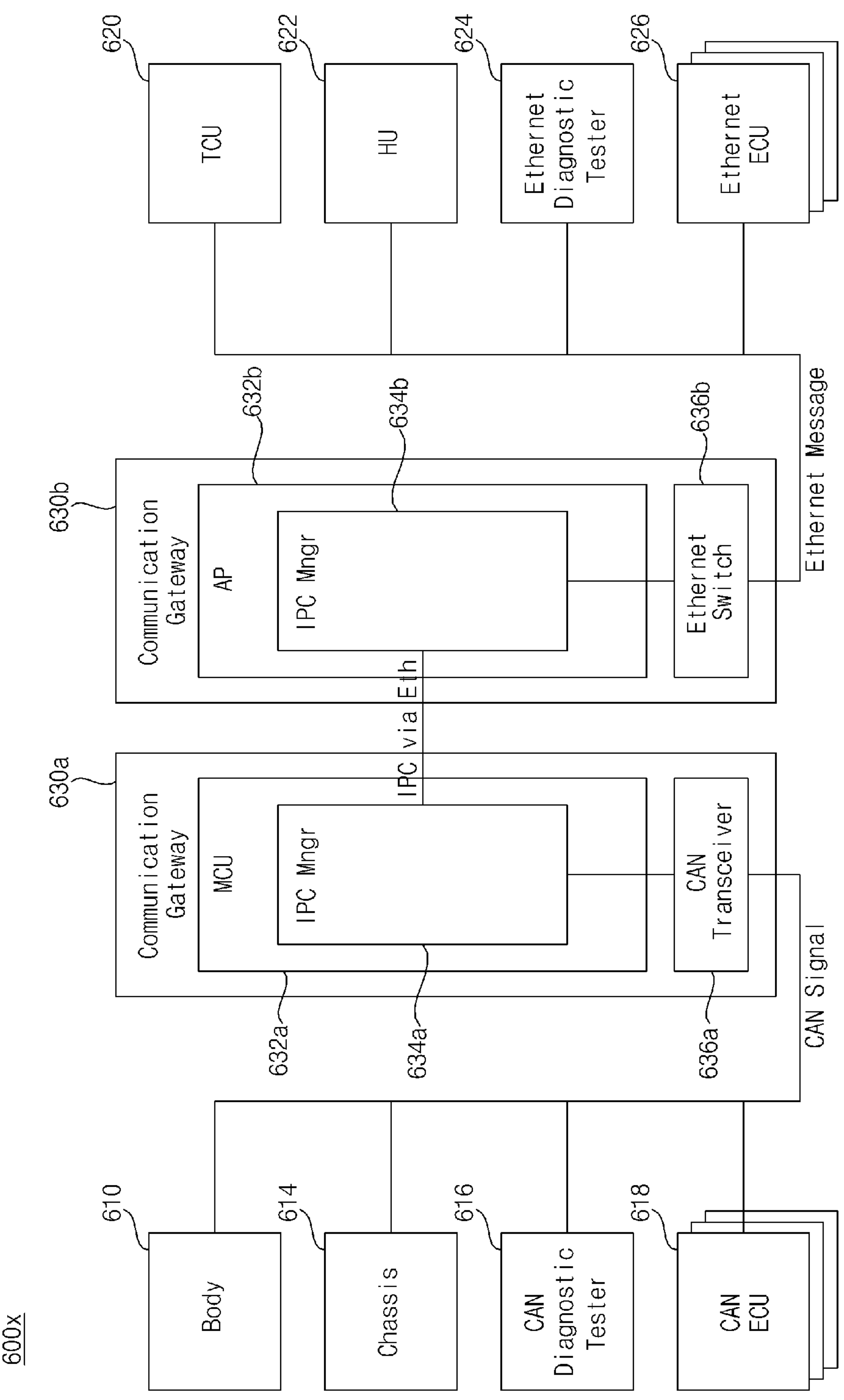
FIG. 6A is an internal block diagram illustrating a vehicle communication device associated with the present disclosure.

FIG. 6A is an internal block diagram illustrating a vehicle communication device associated with the present disclosure.

Referring to the drawing, a vehicle communication device 600*x* associated with the present disclosure may include a first communication gateway 630*a* and a second communication gateway 630*b*.

The first communication gateway 630*a* may include a body module 610, a chassis module 614, a CAN diagnostic tester 616, a CAN transceiver 636*a* for exchanging a CAN signal by CAN communication with at least one CAN ECU 618 and the like, and a first processor 632*a* for performing signal processing on the CAN signal received from the CAN transceiver 636*a*.

Meanwhile, the first processor 632*a* may include an IPC manager 634*a* for inter-processor communication with a second processor 632*b* in the second communication gateway 630*b*.

The second communication gateway 630*b* may include a telematics control module 620, a head module 622, an Ethernet diagnostic tester 624, an Ethernet switch 636*b* for exchanging an Ethernet message by Ethernet communication with at least one Ethernet ECU 626, and a second processor 632*b* for performing signal processing on the Ethernet message received from the Ethernet switch 636*b*.

Meanwhile, the second processor 632*b* may include an IPC manager 634*b* for inter-processor communication with the first processor 632*a* in the first communication gateway 630*a*.

Meanwhile, the IPC manager 634*a* in the first processor 632*a* and the IPC manager 643*b* in the second processor 632*b* may perform inter-processor communication based on the Ethernet communication.

Figure 6B:
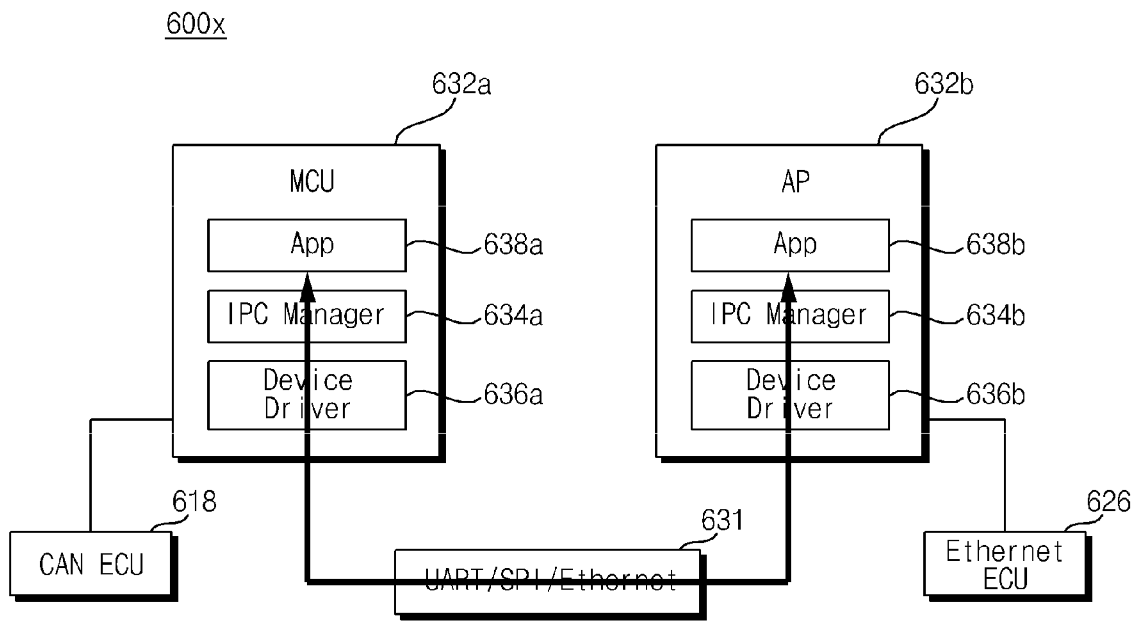
FIG. 6B is a diagram referred to in the description of FIG. 6A.

FIG. 6B is a diagram referred to in the description of FIG. 6A.

Referring to the drawing, a first processor 632*a* may execute an IPC manager 634*a* for inter-processor communication with a second processor 632*b*, a device driver 636*a* for data transmission, and an application 638*a*.

The first processor 632*a* may receive a CAN signal from a CAN ECU 618 through the device driver 636*a*, and may perform UART, SPI, or Ethernet communication 631 with the second processor 632*b* through inter-processor communication.

The second processor 632*b* may execute an IPC manager 634*b* for inter-processor communication with the first processor 632*a*, a device driver 636*b* for data transmission, and an application 638*b*.

The second processor 632*b* may receive an Ethernet signal from an Ethernet ECU 626 through the device driver 636*b*, and may perform UART, SPI, or Ethernet communication 631 with the first processor 632*a* through inter-processor communication.

In this manner, data is transmitted between the first processor 632*a* and the second processor 632*b* via the device drivers 636*a* and 636*b*, respectively, such that data copy is required for each step, thereby limiting real-time data transmission or high-speed data transmission.

Particularly, a delay occurs when CAN data is transmitted from the first processor 632*a* to the second processor 632*b* and is converted into Ethernet data. Particularly, a processing delay is more problematic in the first processor 632*a* which has a slower processing speed than the second processor 632*b*.

Accordingly, the present disclosure proposes a method of reducing latency and performing high-speed data transmission during inter-processor communication, which will be described below with reference to FIG. 7A and subsequent figures.

FIG. 7A is an example of an internal block diagram illustrating a vehicle communication device according to an embodiment of the present disclosure.

Referring to the drawing, the vehicle communication device 700 according to an embodiment may include: a first processor 732*a*, which based on a first communication scheme along with a first communication gateway 730*a* and a second communication gateway 730*b*, is configured to receive a first message including a sensor signal in a vehicle and to perform signal processing on the received first message; a second processor 732*b*, which based a second communication scheme, is configured to receive a second message including a communication message received from an external source and to perform signal processing of the received second message; and a shared memory 508 configured to operate to transmit the first message or the second message between the first processor 732*a* and the second processor 732*b*.

In comparison with the communication device 600*x* of FIG. 6A, by using the shared memory 508 for inter-processor communication (IPC) between the first processor 732*a* and the second processor 732*b*, latency may be reduced and high-speed data transmission may be performed during the inter-processor communication.

Further, in comparison with the communication device 600*x* of FIG. 6A, by integrating the first processor 732*a*, the second processor 732*b*, and the shared memory 508 into the signal processing device 170 implemented as a single chip, latency may be reduced and high-speed data transmission may be performed during the inter-processor communication.

Meanwhile, it is preferred that the second communication scheme has a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message. Meanwhile, the signal processing device 170 and the vehicle communication device 700 including the same according to an embodiment of the present disclosure may further include: a transceiver 736*a*, which based on the first communication scheme, is configured to receive a first message including a sensor signal in a vehicle and to transmit the first message to the first processor 732*a*; and the switch 736*b*, which based on the second communication scheme, is configured to receive a second message including a communication message received from an external source, and to transmit the second message to the second processor 732*b*, such that the first and second messages may be transmitted stably to the first processor 732*a* and the second processor 732*b*.

The first processor 732*a* or the transceiver 736*a* may exchange a CAN signal by CAN communication with the body module 610, the chassis module 614, the CAN diagnostic tester 616, at least one CAN ECU 618, and the like.

Meanwhile, the first processor 732*a* may include a first manager 734*a* for inter-processor communication (IPC) with the second processor 732*b*. The first manager 734*a* may be referred to as an IPC manager.

Meanwhile, the first manager 734*a* may include a first cache 735*a*.

Meanwhile, the second processor 732*b* or the switch 736*b* may exchange an Ethernet message by Ethernet communication with the telematics control module 620, the head module 622, the Ethernet diagnostic tester 624, at least one Ethernet ECU 626, and the like. The switch 736*b* may be referred to as an Ethernet switch.

Meanwhile, the second processor 732*b* may include a second manager 734*b* for inter-processor communication (IPC) with the first processor 732*a*. The second manager 734*a* may be referred to as an IPC manager.

Meanwhile, the second manager 734*b* may include the second manager 734*b* including a second cache 735*b* and a timer 737.

Meanwhile, the second processor 723*b* may receive a request for periodic subscription to the first message from the Ethernet processor or the Ethernet ECU 626.

Accordingly, the second processor 732*b* may send the request for periodic subscription to the first message to the first processor 732*a*.

Particularly, the second processor 732*b* may transmit the subscription request through the inter-processor communication (IPC). Accordingly, the inter-processor communication may be performed.

Meanwhile, the first processor 732*a* may periodically receive CAN data from the at least one CAN ECU 618 and the like.

For example, the first processor 732*a* periodically receives the first message, predefined in a CAN database (DB), from the at least one CAN ECU 618 and the like.

For example, the periodic first message, which is sensor information, may include vehicle speed information, position information, or the like.

In another example, the periodic first message may include at least one of vehicle direction information, vehicle position information (GPS information), vehicle angle information, vehicle acceleration information, vehicle tilt information, forward/backward movement information, battery information, fuel information, tire information, vehicle lamp information, in-vehicle temperature information, and in-vehicle humidity information.

Meanwhile, the first processor 732*a* may select a first message, for which the subscription is requested, among the periodically received CAN data or first messages, and may transmit the first message, for which the subscription is requested, to the second processor 732*b*.

Meanwhile, the first processor 732*a* may separately process a first message, for which the subscription is not requested, among the periodically received CAN data or first messages, without transmitting the message to the second processor 732*b*.

Specifically, upon receiving the first message for which the subscription is requested, the first processor 732*a* may store the first message in the first cache 735*a* or may manage the first message. Upon receiving the first message, the first processor 732*a* may compare the first message with a value stored in the first cache 735*a*, and when a difference between the first message and the stored value is greater than or equal to a predetermined value, the first processor 732*a* may transmit the first message to the second processor 732*b* through the inter-processor communication.

Meanwhile, upon receiving the first message for which the subscription is requested, the first processor 732*a* may store the first message in the first cache 735*a* or may manage the first message. Upon receiving the first message, the first processor 732*a* may compare the first message with a value stored in the first cache 735*a*, and when a difference between the first message and the stored value is greater than or equal to a predetermined value, the first processor 732*a* may transmit the first message to the second processor 732*b* through the inter-processor communication using the shared memory 508.

For example, upon receiving the first message, the first processor 732*a* may compare the message with a value stored in the first cache 735*a*, and if the two are not the same, the first processor 732*a* may transmit the first message to the second processor 732*b* through the inter-processor communication using the shared memory 508.

In another example, upon receiving the first message, the first processor 732*a* may compare the message with the value stored in the first cache 735*a*, and if the two are the same, the first processor 732*a* may not transmit the first message to the second processor 732*b*.

Accordingly, by minimizing cache occupancy or buffer occupancy of the same data, it is possible to reduce latency and to perform high-speed data transmission during inter-processor communication.

Meanwhile, upon first receiving the first message, the second processor 732*b* may store the first message in the second cache 735*b*, and upon subsequently receiving the first message, the second processor 732*b* may update the second cache 735*b*. Accordingly, latency may be reduced and high-speed data transmission may be performed during inter-processor communication.

Meanwhile, upon receiving the first message, the second processor 732*b* may generate a thread of the timer 737, and each time the thread terminates, the second processor 732*b* may send a value in the second cache 735*b* to the Ethernet processor or the Ethernet ECU 626. Accordingly, latency may be reduced and high-speed data transmission may be performed during inter-processor communication.

Meanwhile, during a period in which the inter-processor communication is not performed such that the first message is not received, the second processor 732*b* may send a value in the second cache 735*b* to the Ethernet processor or the Ethernet ECU 626.

That is, if a value of the subscribed first message is constant during the period, the cache value stored in the second processor 732*b* may be sent to the Ethernet processor 626 without the inter-processor communication.

Accordingly, it is possible to minimize the usage of the IPC buffer in the shared memory 508 which operates in FIFO mode. In addition, by maintaining the usage of the IPC buffer to a minimum, data including the first message, the second message, or the like may be transmitted rapidly through the inter-processor communication.

Meanwhile, during a period in which the inter-processor communication is performed such that the first message is received, the second processor 732*b* may send a value in the updated second cache 735*b* to the Ethernet processor or the Ethernet ECU 626. Accordingly, latency may be reduced and high-speed data transmission may be performed during inter-processor communication.

Meanwhile, during the inter-processor communication, the shared memory 508 may transmit data between the first processor 732*a* and the second processor 732*b* through a first queue PTb and a second queue PTa having a higher priority than the first queue PTb.

Particularly, even when the number of events for the inter-processor communication increases, the shared memory 508 may transmit only the data, corresponding to events allocated for the second queue PTa, through the second queue PTa. Accordingly, real-time transmission of a high priority event may be ensured during the inter-processor communication.

For example, the first PTb may be a normal priority queue, and the second queue PTa may be a high priority queue.

Specifically, the shared memory 508 may transmit most of the data through the first queue PTb during the inter-processor communication.

However, the share memory 508 may transmit only time sensitive-critical data without delay through the second queue PTa which is a higher priority queue than the first queue PTb.

For example, the time sensitive-critical data may be speed data, position information data, or the like.

That is, the shared memory 508 may transmit the speed data or position information data between the first processor 732*a* or the second processor 732*b* through the second queue PTa. Accordingly, real-time transmission of the speed data or the position information data having a high priority may be ensured during the inter-processor communication.

Meanwhile, the first processor 732*a* or the second processor 732*b* may manage a list of applications capable of using the second queue PTa.

For example, the second processor 732*b* may include an application for displaying speed information, as an application capable of using the second queue PTa, in a second list 738*b* and may manage the list.

Meanwhile, for real-time transmission through the second queue PTa, a minimum operation is preferred so that there may be no redundant scenarios or applications.

As described above, by transmitting the time sensitive-critical data in real time using the second queue PTa, real-time transmission of a high priority event may be ensured during the inter-processor communication.

Meanwhile, during the inter-processor communication, the shared memory 508 may reduce latency and may perform high-speed data transmission by assigning at least two queues.

In the drawing, an example is illustrated in which the first manager 734*a* in the first processor 732*a* manages a first list 738*a* which is a whitelist, and the second manager 734*b* in the second processor 732*b* manages a second list 738*b* which is a whitelist, thereby ensuring the real-time transmission of a high-priority event during the inter-processor communication.

Figure 7B:
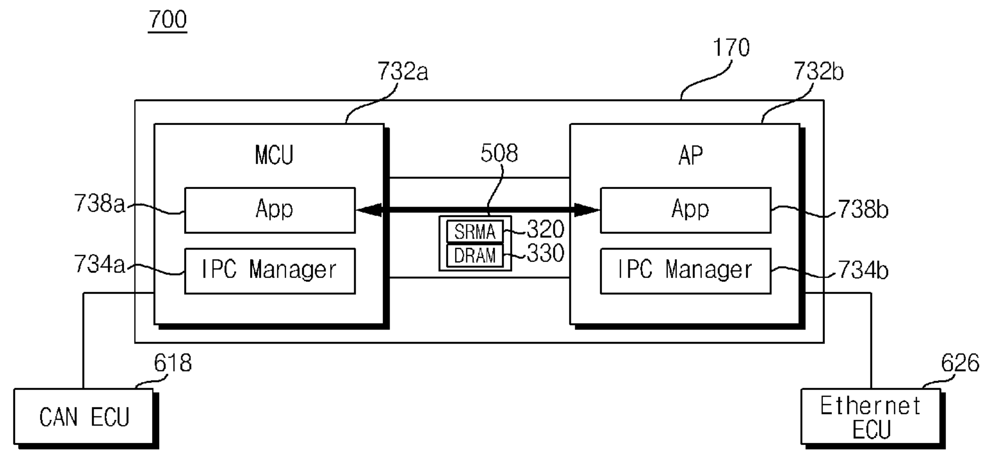
FIG. 7B is a diagram referred to in the description of FIG. 7A.

FIG. 7B is a diagram referred to in the description of FIG. 7A.

Referring to the drawing, the first processor 732*a* may execute an IPC manager 734*a* for inter-processor communication with the second processor 732*b*, and an application 738*a*. Unlike FIG. 6B, the first processor 732*a* does not execute a device driver.

The first processor 732*a* may receive a CAN signal from the CAN ECU 618 through the IPC manager 734*a*, and may perform inter-processor communication (IPC) with the second processor 732*b* through the shared memory 508 based on the first memory 320 or the second memory 330.

The second processor 732*b* may execute an IPC manager 734*b* for inter-processor communication with the first processor 732*a*, and an application 638*b*. Unlike FIG. 6B, the second processor 732*b* does not execute a device driver.

The second processor 632*b* may receive an Ethernet signal from the Ethernet ECU 626 via the IPC manager 734*b*, and may perform inter-processor communication (IPC) with the first processor 732*a* via the shared memory 508 based on the first memory 320 or the second memory 330.

In this manner, data is transmitted between the first processor 732*a* and the second processor 732*b* via the shared memory 508, thereby allowing real-time data transmission or high-speed data transmission.

FIG. 8 is another example of an internal block diagram illustrating a vehicle communication device according to an embodiment of the present disclosure.

Referring to the drawing, a vehicle communication device 700*b* according to an embodiment of the present disclosure includes a signal processing device 170 implemented in the form of a system on chip (SOC).

The signal processing device 170 in the vehicle communication device 700*b* includes: a first processor 732*a* configured to receive a first message based on a first communication scheme and to perform signal processing of the received first message, wherein the first message includes a sensor signal in a vehicle; a second processor 732*b* configured to receive a second message based on a second communication scheme and to perform signal processing of the received second message, wherein the second message includes a communication message received from an external source; and a shared memory 508 configured to operate to transmit the first message or the second message between the first processor 732*a* and the second processor 732*b*.

The first processor 732*a* or the second processor 732*b* receives the first message or the second message, which is stored in the shared memory 508, based on an interrupt signal. Accordingly, latency may be reduced and high-speed data transmission may be performed during inter-processor communication. Particularly, messages based on different communication schemes may be rapidly transmitted.

Meanwhile, the first processor 732*a* may include the first processor core 3170 and the second processor core 317*a*.

The first processor core 3170 may execute a Software Component 738*aa* including an IPC interface, and an IPC handler 314.

The IPC handler 314 may execute an interrupt mitigator IMa, a data throttling handler DTa, and a Quality of Service handler (QOS handler) QHa.

The second processor core 317*a* may execute a Software Component 738*ab* including an IPC interface, and an IPC handler 314*b*.

The IPC handler 314*b* may execute an interrupt mitigator IMb, a data throttling handler DTb, and a QoS handler QHb.

Meanwhile, the second processor 732*b* may include a plurality of processor cores. For example, in the case where the second processor 732*b* has better performance than the first processor 732*a*, the number of cores of the second processor 732*b* is preferably greater than the number of cores of the first processor 732*a*.

The second processor 732*b* may execute the IPC driver 348 including the interrupt mitigator IMC that receives an interrupt signal, an IPC service 345, and a plurality of applications 738*ba* and 738*bb*.

The IPC service 345 may execute a data throttling handler DTc and a QoS handler QHc.

Meanwhile, the plurality of applications 738*ba* and 738*bb*, each including the IPC interface, may receive data from the first memory 320 or the second memory 330.

Meanwhile, the signal processing device 170 in the vehicle communication device 700*b* may include the first memory 320 and the second memory 330 which are used as the shared memory 508.

For example, the first memory 320 may be a Static RAM (SRAM), and the second memory 330 may be a DDR memory. Particularly, the second memory 330 may be a Double data rate synchronous dynamic random access memory (DDR SDRAM).

The first memory 320 may store a control channel and a plurality of lock-free queues.

The second memory 330 may store a control channel and a plurality of CAN data.

Meanwhile, the first memory 320 may store an IPC channel, and the second memory 330 may include CAN data which is sensor data including vehicle speed data.

Meanwhile, the signal processing device 170 in the vehicle communication device 700*b* may further include an interrupt router ROT configured to output an interrupt signal to the first processor 732*a* or the second processor 732*b*.

Specifically, the interrupt router ROT may output the interrupt signal to the respective cores 3170 and 317*a* in the first processor 732*a* or the respective cores CR0 to CR2 in the second processor 732*b*. Accordingly, the processor may be used efficiently based on the interrupt signal.

Further, the interrupt router ROT may dynamically adjust the number of triggering of the interrupt signal. Accordingly, the processor may be used efficiently based on the interrupt signal.

Referring to the drawing, the second processor core 317*a* may store CAN data, which is a first message, in the second memory 330, and a first application 738*ba* of the plurality of applications 738*ba* and 738*bb* may access the second memory 330, acting as a shared memory, to receive the CAN data which is the first message.

Meanwhile, a second application 738*bb* of the plurality of applications 738*ba* and 738*bb* may store Ethernet data, which is a second message, in a lock-free queue of the first memory 320, and the application 738*aa* running in the first processor 732*a* may access the lock-free queue in the first memory 320, acting as a shared memory, to receive the Ethernet data which is the second message.

Meanwhile, in the case of using the lock-free queue in the first memory 320, the first processor 732*a* or the second processor 732*b* may operate based on the lock-free queue, thereby allowing operation without a locking mechanism for the processor.

Meanwhile, the shared memory 508 may be divided into areas based on each application executed in the first processor 732*a* or the second processor 732*b*.

In the drawing, an example is illustrated in which the second application 738*bb* of the plurality of applications 738*ba* and 738*bb* uses the second memory 330 of the shared memory 508, and the first application 738*ba* uses the first memory 320 of the shared memory 508. Accordingly, the shared memory 508 may be stably used.

Meanwhile, the shared memory 508 may be divided into areas according to types of messages transmitted to the first processor 732*a* or the second processor 732*b*.

For example, if a transmitted message is CAN data, the second memory 330 of the shared memory 508 may be used, and if a transmitted message is Ethernet data, the first memory 320 of the shard memory 508 may be used. Accordingly, the shared memory 508 may be stably used.

Meanwhile, the first processor 732*a* or the second processor 732*b* may transmit or receive the first message or the second message based on a dynamic bandwidth according to a processor clock or memory access performance. Accordingly, latency may be reduced and high-speed data transmission may be performed during inter-processor communication. Further, data transmission loss may be significantly reduced based on a processor clock or memory access performance.

Meanwhile, the first processor 732*a* may transmit the first message to the shared memory 508 based on a first dynamic bandwidth according to a first clock, and the second processor 732*b* nay transmit the second message to the shared memory 508 based on a second dynamic bandwidth according to a second clock. Accordingly, latency may be reduced and high-speed data transmission may be performed during inter-processor communication. Further, data transmission loss may be significantly reduced based on a processor clock or memory access performance.

For example, in the case where the second processor 732*b* has better performance than the first processor 732*a*, the second processor 732*b* may transmit the second message to the shared memory 508 based on the second dynamic bandwidth which is greater than the first dynamic bandwidth. Accordingly, the second message, which is a large message, may be rapidly transmitted.

FIGS. 9A to 13B are diagrams referred to in the description of FIG. 8.

FIG. 9A is a diagram illustrating an example of transmitting CAN data, input from an external source, to an Ethernet interface.

Referring to the drawing, the CAN data input from an external source may be transmitted to an external Ethernet interface 738*b* via the first processor 732*a*, the first memory 320 which is a shared memory, and the second processor 732*b*.

Specifically, the CAN data input from an external source may be input to the second processor 732*b* via the interface 319 for receiving a CAN message and the IPC module 318 in the first processor 732*a*, and then via the first memory 320.

Meanwhile, the second processor 732*b* may transfer the CAN data to the external Ethernet interface 738*b* via a diagnosis server application 342 executed in the second processor 732*b*.

For example, if the CAN data is camera data, the camera data may be transferred to the external Ethernet interface 738*b*. Further, the display 180*b* connected to the Ethernet interface 738*b* may display a camera image based on the camera data.

In another example, if the CAN data is vehicle speed data, the vehicle speed data may be transferred to the external Ethernet interface 738*b*. Further, the display 180*b* connected to the Ethernet interface 738*b* may display vehicle speed information based on the vehicle speed data.

Figure 9B:
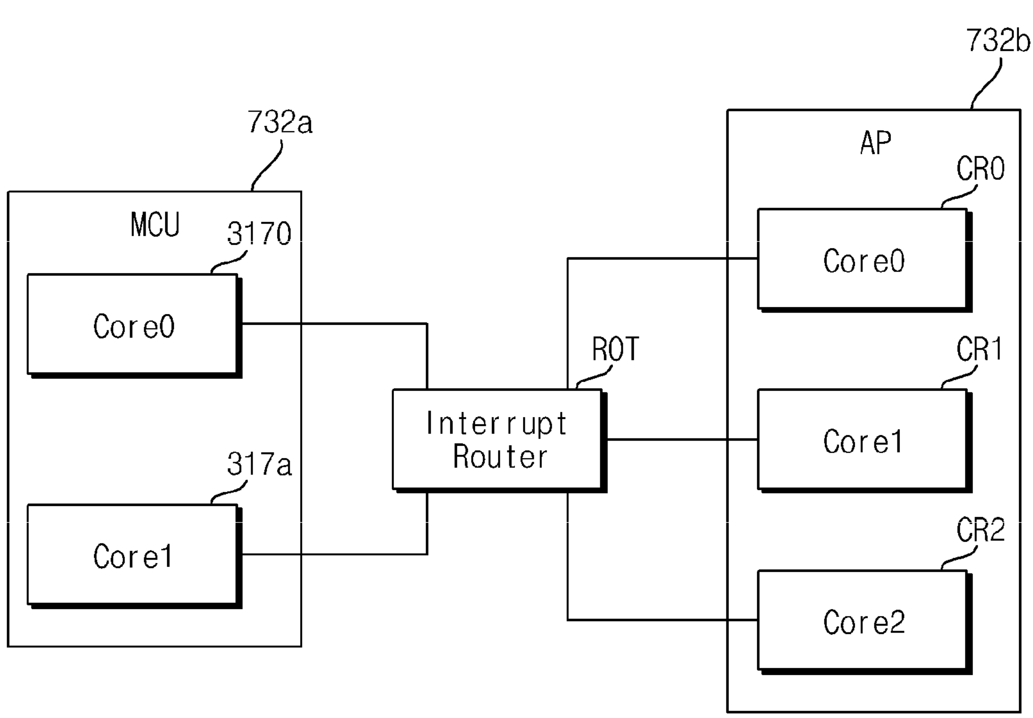
FIGS. 9A to 13B are diagrams referred to in the description of FIG. 8.

FIG. 9B is a diagram illustrating an example of outputting an interrupt signal to the first processor 732*a* and the second processor 732*b*.

Referring to the drawing, the first processor 732*a* may include the first processor core 3170 and the second processor core 317*a*, and the second processor 732*b* may include a first processor core CR0, a second processor core CR1, and a third processor core CR2.

The interrupt router ROT may output an interrupt signal to the respective cores 3170 and 317*a* in the first processor 732*a* and the respective cores CR0 to CR2 in the second processor 732*b*, or may receive the interrupt signal. Accordingly, the processor may be used efficiently based on the interrupt signal.

Figure 10B:
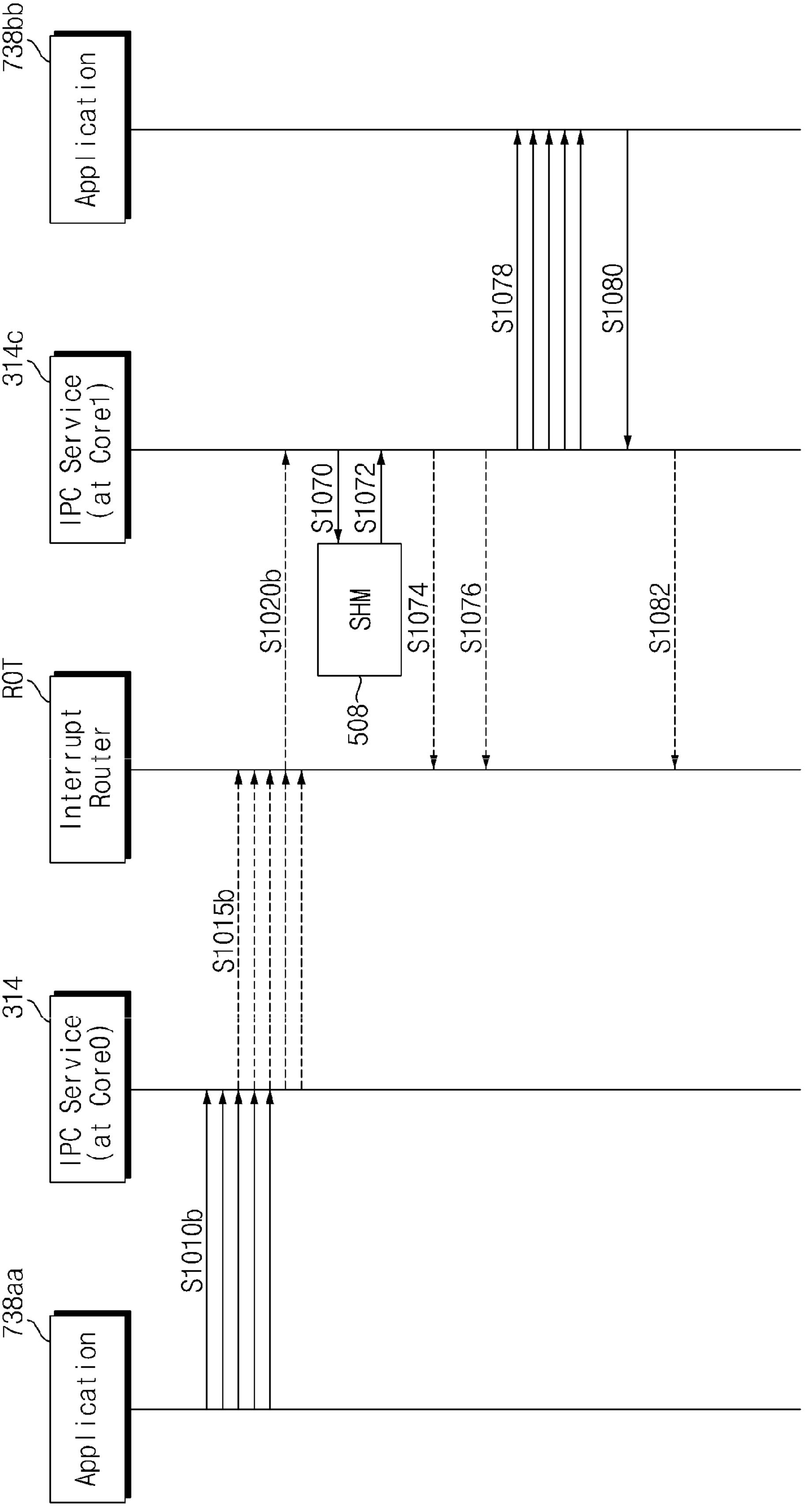

FIGS. 10A and 10B are diagrams explaining Dynamic Interrupt Mitigation.

First, FIG. 10A is a diagram illustrating an example of Dynamic Interrupt Mitigation.

Referring to the drawing, the first application 738*aa* running in the processor 732*a* transmits data multiple number of times (e.g., five times) to the IPC service 314 implemented in the first processor 732*a* (S1010), and the IPC service 314 transmits an interrupt signal multiple number of times (e.g., five times) to the interrupt router ROT (S1015).

Based on Dynamic Interrupt Mitigation, the interrupt router ROT transmits a first interrupt signal, corresponding to some number of times (e.g., first time) among the multiple number of times, to an IPC service 314*c* implemented in the second d processor 732*b* (S1020), and the IPC service 314*c* transmits data to an application 738*bb* running in the second processor 732*b*. Accordingly, the application 738*bb* reads first data from the IPC service 314*c* and transmits a first return signal (S1030).

Then, the interrupt router ROT transmits a second interrupt signal to the IPC service 314*c* (S1032), and the application 738*bb* reads second data from the IPC service 314*c* and transmits a second return signal (S1036).

Subsequently, the interrupt router ROT transmits a third interrupt signal to the IPC service 314*c* (S1042), and the application 738*bb* reads third data from the IPC service 314*c* (S1044) and transmits a third return signal (S1046).

Next, the interrupt router ROT transmits a fourth interrupt signal to the IPC service 314*c* (S1052), and the application 738*bb* reads fourth data from the IPC service 314*c* (S1054) and transmits a fourth return signal (S1056).

Then, the interrupt ROT router transmits a fifth interrupt signal to the IPC service 314*c* (S1062), and the application 738*bb* reads fifth data from the IPC service 314*c* (S1064) and transmits a fifth return signal (S1066).

Next, FIG. 10B is a diagram illustrating another example of Dynamic Interrupt Mitigation.

Referring to the drawing, the first application 738*aa* running in the processor 732*a* transmits data multiple number of times (e.g., five times) to the IPC service 314 implemented in the first processor 732*a* (S1010*b*), and the IPC service 314 transmits an interrupt signal multiple number of times (e.g., five times) to the interrupt router ROT (S1015*b*).

Based on Dynamic Interrupt Mitigation, the interrupt router ROT transmits a first interrupt signal, corresponding to some number of times (e.g., first time) among the multiple number of times, to the IPC service 314*c* implemented in the second processor 732*b* (S1020*b*), and the IPC service 314*c* checks the shared memory 508 for data for reading (S1070), and receives a result about remaining data for reading (S1072).

For example, if a result about the data for reading corresponds to disable data read, the IPC service 314*c* outputs a disable interrupt signal to the interrupt router ROT (S1074).

In another example, if a result about the data for reading corresponds to enable data read, the IPC service 314*c* outputs a clear interrupt signal to the interrupt router ROT (S1076).

Then, the IPC service 314*c* transmits data, corresponding to the multiple number of times, all at once to the application 738*bb* running in the second processor 732*b*. Accordingly, the application 738*bb* reads first to fifth data from the IPC service 314*c* (S1078) and transmits a return signal (S1080).

Then, the IPC service 314*c* transmits an enable interrupt signal to the interrupt router ROT (S1082).

Compared to the method of FIG. 10A, the method of FIG. 10B allows efficient data transmission based on Dynamic Interrupt.

FIG. 10C is a diagram referred to in the description of data throttling.

Referring to the drawing, during transmission of a second message from the second processor 732*b* to the first processor 732*a*, an application executed in the second processor 732*b* transmits data corresponding to the second message (S1110), and the IPC service 734*b* implemented in the second processor 732*b* writes the received data to the shared memory 508 (S1115).

Meanwhile, the application executed in the first processor 732*a* may read the data written to the shared memory 508 (S1118).

In this case, the IPC service 734*b* implemented in the second processor 732*b* outputs an interrupt signal to the IPC service 734*a* implemented in the first processor 732*a* (S1120), and the IPC service 734*a* checks read performance (S1120).

In response, the IPC service 734*b* implemented in the second processor 732*b* also checks write performance (S1122).

Meanwhile, during transmission of a first message from the first processor 732*a* to the second processor 732*b*, an application executed in the first processor 732*a* transmits data corresponding to the first message (S1125), and the IPC service 734*a* implemented in the first processor 732*a* writes the received data to the shared memory 508 (S1127).

Meanwhile, an application executed in the second processor 732*b* may read the data written to the shared memory 508 (S1129).

In this case, the IPC service 734*a* implemented in the first processor 732*a* outputs an interrupt signal to the IPC service 734*b* implemented in the second processor 732*b* (S1132), and the IPC service 734*b* checks read performance (S1136).

In response, the IPC service 734*a* implemented in the first processor 732*a* also checks write performance (S1134).

Regarding FIG. 10C, the first processor 732*a* or the second processor 732*b* may operate based on a lock-free queue, thereby allowing operation without a locking mechanism for the processor.

Meanwhile, regarding FIG. 10C, the first processor 732*a* or the second processor 732*b* may transmit or receive a first message or a second message based on a dynamic bandwidth according to a processor clock or memory access performance.

For example, the first processor 732*a* may transmit a first message to the shared memory 508 based on a first dynamic bandwidth according to a first clock, and the second processor 732*b* may transmit a second message to the shared memory 508 based on a second dynamic bandwidth according to a second clock. Accordingly, latency may be reduced and high-speed data transmission may be performed during inter-processor communication. Further, data transmission loss may be significantly reduced based on a processor clock or memory access performance.

Figure 11A:
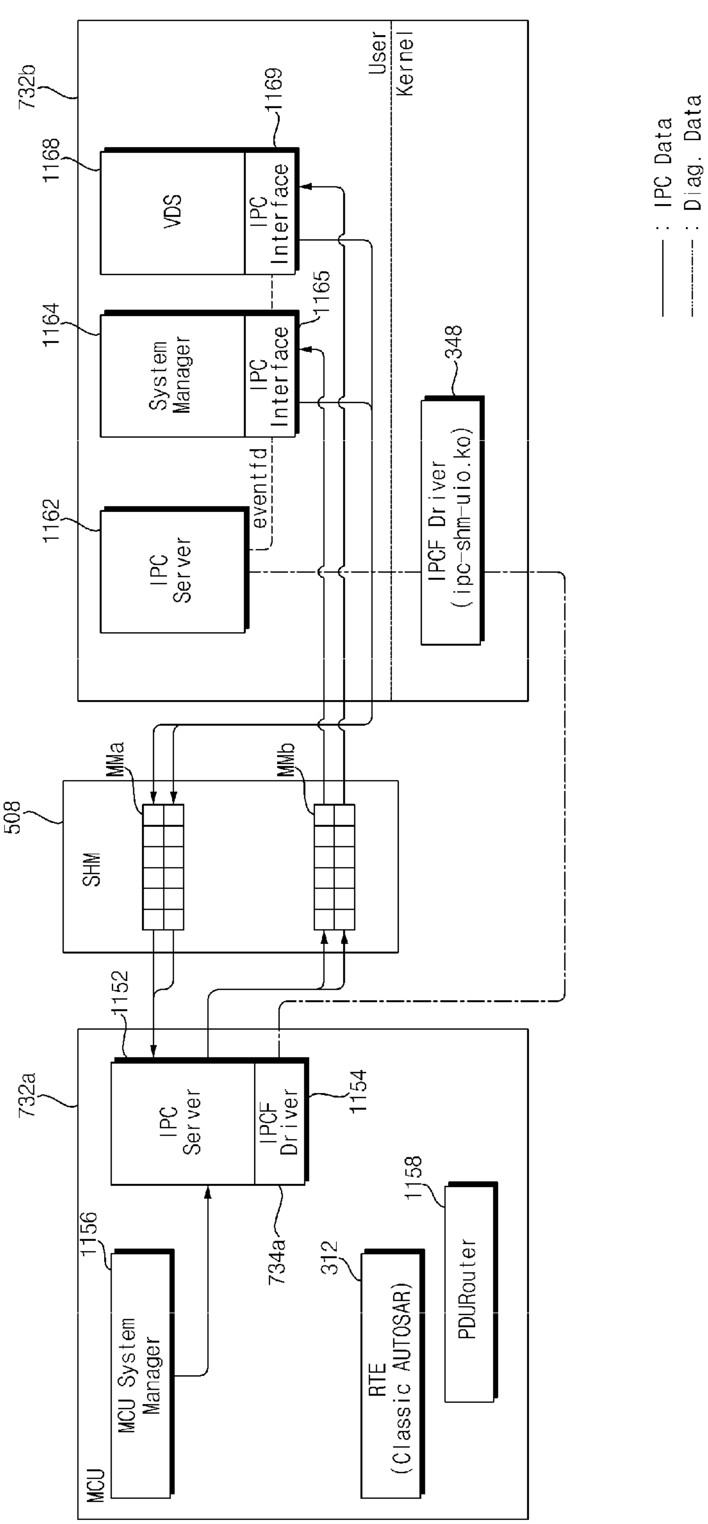
Figure 11B:
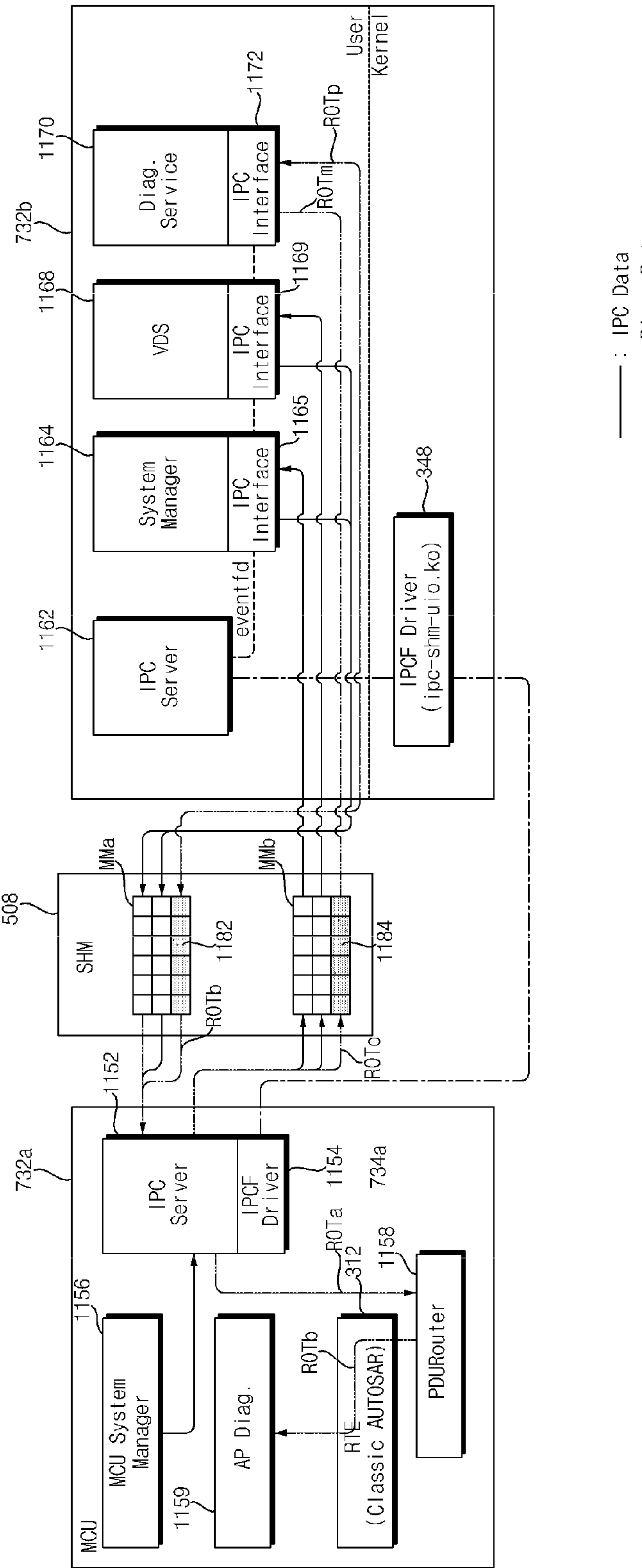

FIGS. 11A and 11B are diagrams referred to in the description of zero copy.

First, FIG. 11A is a diagram illustrating an example in which a first message is stored in a first area MMb of the shared memory 508, and a second message is stored in a second area MMa of the shared memory 508.

Referring to the drawing, the first processor 732*a* executes a first server 1152 and a first driver 1154 for inter-processor communication (IPC).

Meanwhile, the first processor 732*a* may further execute a system manager 1156, the AUTOSAR 312, and a router 1158.

Meanwhile, the second processor 732*b* executes a second server 1162 and a second driver 348 for inter-processor communication (IPC).

Meanwhile, the second processor 732*b* may further execute a system manager 1164 and a Vehicle Detection System (VDS) 1168.

Meanwhile, an interrupt signal is transmitted between the first server 1152 and the second server 1162, and the first server 1152 or the second server 1162 may transmit or receive data to/from the shared memory 508. Accordingly, latency may be reduced and high-speed data transmission may be performed during inter-processor communication.

If a first message is transmitted from the first processor 732*a* to the second processor 732*b*, the first driver 1154 may transmit an interrupt signal to the second driver 348.

In this case, data corresponding to the first message transmitted from the system manager 1156 in the first processor 732*a* may pass through the first server 1152 and the first area MMb of the shared memory 508, to be transmitted to IP interfaces 1165 and 1169 of the system manager 1164 and the VDS 1168 implemented in the second processor 732*b*.

Meanwhile, if a second message is transmitted from the second processor 732*b* to the first processor 732*a*, the second driver 348 may transmit an interrupt signal to the first driver 1154.

In this case, data corresponding to the second message transmitted from the IP interface 1165 or 1169 of the system manager 1164 or the VDS 1168 in the second processor 732*b* may pass through the second area MMa of the shared memory 508, to be transmitted to the system manager 1156 in the first processor 732*a*.

Referring to FIG. 10A, unnecessary memory copy operations may be removed, and applications running in the respective processors 732*a* and 732*b* may directly access the shared memory 508 using zero copy functionality. In this case, the shared memory 508 may be divided into areas based on each application, causing no problem of intrusion in memory areas, such that the shared memory 508 may be stably used.

While FIG. 11B illustrates an example of transmitting the first message and the second message in a manner similar to FIG. 11A, there is a difference in that analysis data, as the second message, is further transmitted from the second processor 732*b* to the first processor 732*a*. The following description will focus on the difference.

Referring to the drawing, analysis data, transmitted from an IP interface 1172 of an analysis service 1170 in the second processor 732*b*, may be stored in a portion 1182 of the second area MMa of the shared memory 508, the portion 1182 having no data of the second message being stored therein. The analysis data may pass through the shared memory 508 to be transmitted to the first server 1152 executed in the first processor 732*a*.

Meanwhile, the first server 1152 may transmit the analysis data to an analysis application 1159 via the router 1158.

Meanwhile, the first server 1152 may store the analysis data in a portion 1184 of the second area MMM of the shared memory 508, the portion 1184 having no data of the first message being stored therein. The analysis data may pass through the shared memory 508 to be transmitted to the analysis service 1170 implemented in the second processor 732*b*.

Referring to FIG. 1*ba*, the shared memory 508 is divided into areas based on each application, causing no problem of intrusion in memory areas, such that the shared memory 508 may be stably used.

Figure 12:
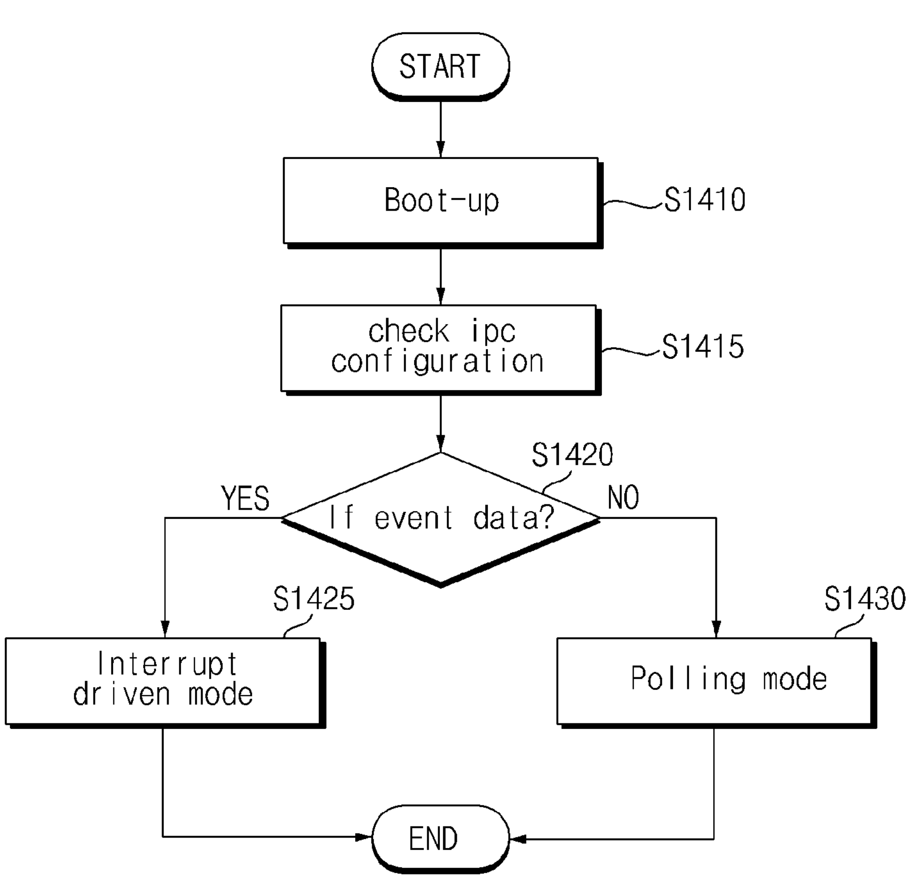

FIG. 12 is a diagram referred to in the description of various modes of an interrupt.

Referring to the drawing, the first processor 732*a* or the second processor 732*b* boots up (S1410) and checks an IPC configuration (S1415).

For example, it is determined whether data transmitted from the first processor 732*a* or the second processor 732*b* is event data (S1420), and if the data is the event data, the first processor 732*a* or the second processor 732*b* operates in an interrupt driven mode (S1425), and if the data is not the event data, the first processor 732*a* or the second processor 732*b* operates in a polling mode (S1430).

Accordingly, if a transmitted message is event-based data, the interrupt router ROT may operate in the interrupt driven mode, and if the transmitted message is periodic data, the interrupt router ROT may operate in the polling mode. Accordingly, the message may be efficiently transmitted.

For example, if a transmitted first message is event-based data, the first processor 732*a* may operate in the interrupt driven mode, and if the transmitted first message is periodic data, the first processor 732*a* may operate in the polling mode. Accordingly, the message may be efficiently transmitted.

In another example, if a transmitted second message is event-based data, the second processor 732*b* may operate in the interrupt driven mode, and if the transmitted second message is periodic data, the second processor 732*b* may operate in the polling mode. Accordingly, the message may be efficiently transmitted.

Accordingly, an interrupt mode may be selected based on data characteristics of the transmitted data, such that data may be efficiently transmitted.

Meanwhile, if the second message includes update data or data for reprogramming, the second processor 732*b* divides the data to transmit the data multiple number of times to the first memory 320. Accordingly, it is possible to prevent performance degradation due to an excessive interrupt.

Meanwhile, the first processor 732*a* may receive the first message through a plurality of channels and transmit the first message through the shared memory 508. Accordingly, the message may be efficiently transmitted.

Meanwhile, the second processor 732*b* may be configured to receive the first message through the shared memory 508, convert the first message into data based on the second communication scheme, and transmit the converted data to an external server 900. Accordingly, the message may be efficiently transmitted.

Figure 13A:
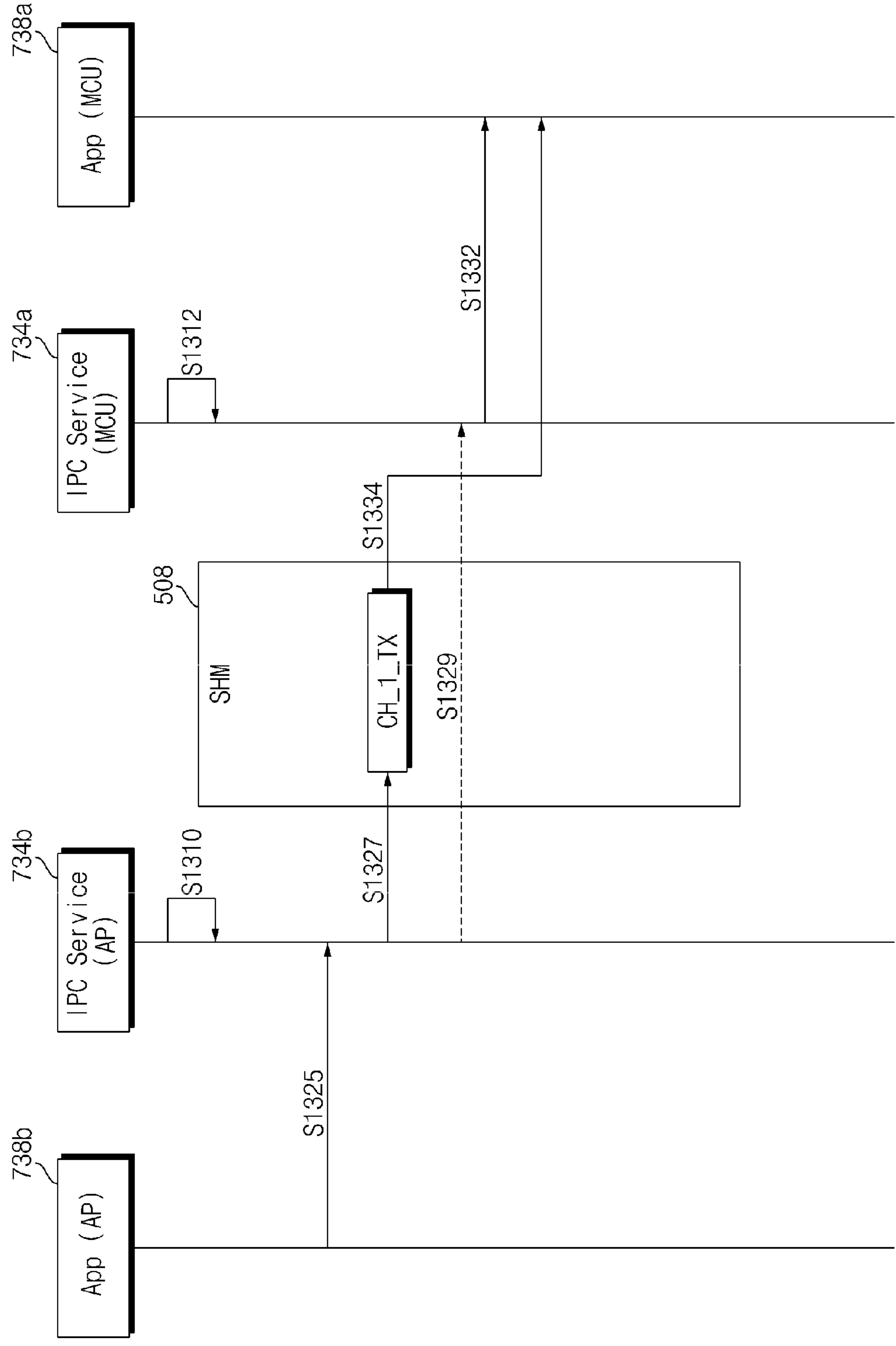
Figure 13B:
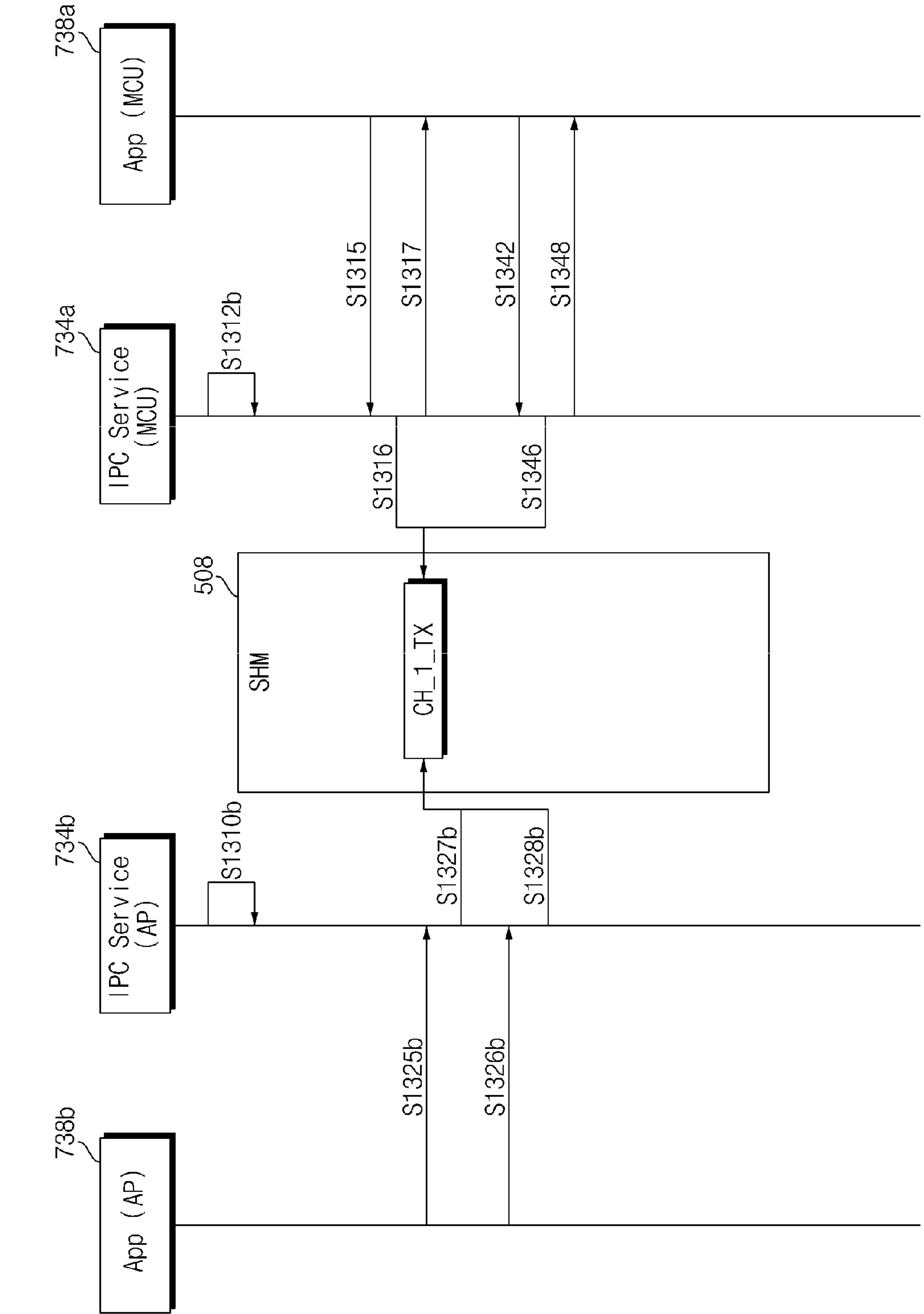

FIGS. 13A and 13B are diagrams referred to in the description of FIG. 12.

FIG. 13A is a diagram explaining an interrupt driven mode.

Referring to the drawing, an IPC service 734*b* implemented in the second processor 732*a* checks an IPC configuration (S1310).

Similarly, the IPC service 734*a* implemented in the first processor 732*a* checks an IPC configuration (S1312).

Based on a result of checking, the first processor 732*a* and the second processor 732*b* may operate in the interrupt driven mode. In this case, the interrupt router ROT may operate in the interrupt driven mode.

Accordingly, an application 738*b* running in the second processor 732*b*, transmits data to the IPC service 734*b* (S1325), and the IPC service 734*b* writes the data to the shared memory 508 (S1327) and transmits an interrupt signal to the IPC service 734*a* implemented in the first processor 732*a* (S1329).

Accordingly, an application 738*a* running in the first processor 732*a* reads data stored in the shared memory 508 (S1322).

FIG. 13B is a diagram explaining a polling mode.

Referring to the drawing, the IPC service 734*b* implemented in the second processor 732*a* checks an IPC configuration (S1310*b*).

Similarly, the IPC service 734*a* implemented in the first processor 732*a* checks an IPC configuration (S1312*b*).

Based on a result of checking, the first processor 732*a* and the second processor 732*b* may operate in the polling mode. In this case, the interrupt router ROT may operate in the polling mode.

Accordingly, an application 738*a* running in the first processor 732*a*, reads data from the IPC service 734*a* (S1315), and the IPC service 734*a* accesses the shared memory 508 to check the data (S1316). In this case, if there is no data to read, the application 738*a* receives an error (S1317).

The application 738*b* running in the second processor 732*b* transmits first data to the IPC service 734*b* (S1325*b*), and the IPC service 734*b* writes the first data to the shared memory 508, and the application 738*b* transmits second data to the IPC service 734*b*, and the IPC service 734*b* writes third data to the shared memory 508 (S1328*b*).

Meanwhile, the application 738*a* running in the first processor 732*a* reads data from the IPC service 734*a* (S1342), and the IPC service 734*a* accesses the shared memory 508 to check the data (S1346). In this case, if there is no data to read, the application 738*a* receives data from the shared memory 508 (S1348).

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising:

a first processor configured to receive a first message based on a first communication scheme and to perform signal processing of the received first message, wherein the first message includes a sensor signal in a vehicle;

a second processor configured to receive a second message based on a second communication scheme and to perform signal processing of the received second message, wherein the second message includes a communication message received from an external source;

a shared memory configured to operate to transmit the first message or the second message between the first processor and the second processor; and an interrupt router configured to output an interrupt signal to the first processor or the second processor, wherein the first processor or the second processor is configured to receive the first message or the second message stored in the shared memory based on an interrupt signal, wherein the first message is stored in a first area of the shared memory, and the second message is stored in a second area of the shared memory, wherein analysis data based on analysis service in the second processor is stored in a portion of the second area, the portion having no data of the second message, and is transmitted to the first processor through the shared memory, and wherein the interrupt router is configured to dynamically adjust a number of interrupt signal triggers.

2. The signal processing device of claim 1, wherein the interrupt router is configured to output an interrupt signal to each core of the first processor or each core of the second processor.

3. The signal processing device of claim 1, wherein the interrupt router is configured to:

in response to a transmitted message being event-based data, operate in an interrupt-driven mode; and in response to the transmitted message being periodic data, operate in a polling mode.

4. The signal processing device of claim 1, wherein the first processor or the second processor operates based on a lock-free queue.

5. The signal processing device of claim 1, wherein the first processor or the second processor is configured to transmit or receive the first message or the second message based on a dynamic bandwidth according to a processor clock or memory access performance.

6. The signal processing device of claim 1, wherein:

the first processor is configured to transmit the first message to the shared memory based on a first dynamic bandwidth according to a first clock; and the second processor is configured to transmit the second message to the shared memory based on a second dynamic bandwidth according to a second clock.

7. The signal processing device of claim 1, wherein the first processor is configured to execute a first server and a first driver for inter-processor communication (IPC), wherein the second processor is configured to execute a second server and a second driver for the inter-processor communication (IPC), wherein the interrupt signal is transmitted between the first server and the second server, and wherein the first server or the second server is configured to transmit or receive data to or from the shared memory.

8. The signal processing device of claim 1, wherein an application executed in the second processor is configured to access the shared memory to receive the first message.

9. The signal processing device of claim 1, wherein an application executed in the first processor is configured to access the shared memory to receive the second message.

10. The signal processing device of claim 1, wherein the shared memory is divided into areas based on each application executed in the first processor or the second processor.

11. The signal processing device of claim 1, wherein the first processor is configured to:

in response to the transmitted first message being event-based data, operate in an interrupt-driven mode; and in response to the transmitted first message being periodic data, operate in a polling mode.

12. The signal processing device of claim 1, wherein in response to the second message including update data or data for reprogramming, the second processor is configured to divide the data and transmit the divided data to the shared memory.

13. The signal processing device of claim 1, wherein the first processor is configured to receive the first message through a plurality of channels and transmit the first message through the shared memory.

14. The signal processing device of claim 1, wherein the second processor is configured to receive the first message through the shared memory, to convert the first message into data based on the second communication scheme, and to transmit the converted data to an external server.

15. The signal processing device of claim 1, wherein the first processor comprises a first manager including a first cache for inter-processor communication (IPC); and wherein the second processor comprises a second manager including a timer and a second cache for the IPC.

16. The signal processing device of claim 15, wherein upon receiving the first message corresponding to a subscription request, the first processor is configured to store the first message in the first cache or manage the first message, and wherein upon receiving the first message, the first processor is configured to compare the first message with a value stored in the first cache, and in response to a difference between the first message and the stored value being greater than or equal to a predetermined value, to transmit the first message to the second processor through the IPC.

17. The signal processing device of claim 1, further comprising:

a first memory including an IPC channel; and a second memory configured to store sensor data including vehicle speed data, wherein the shared memory is selected from the first memory or the second memory based on an available size of the first memory or the second memory.

18. A vehicle communication device comprising a signal processing device, wherein the signal processing device comprises:

a first processor configured to receive a first message based on a first communication scheme and to perform signal processing of the received first message, wherein the first message includes a sensor signal in a vehicle;

a second processor configured to receive a second message based on a second communication scheme and to perform signal processing of the received second message, wherein the second message includes a communication message received from an external source;

a shared memory configured to operate to transmit the first message or the second message between the first processor and the second processor; and an interrupt router configured to output an interrupt signal to the first processor or the second processor, wherein the first processor or the second processor is configured to receive the first message or the second message stored in the shared memory based on an interrupt signal, wherein the first message is stored in a first area of the shared memory, and the second message is stored in a second area of the shared memory, wherein analysis data based on analysis service in the second processor is stored in a portion of the second area, the portion having no data of the second message, and is transmitted to the first processor through the shared memory, and wherein the interrupt router is configured to dynamically adjust a number of interrupt signal triggers.

* * * * *